United States Patent
Miyazawa

[11] Patent Number: 5,828,911
[45] Date of Patent: *Oct. 27, 1998

[54] ONE CHIP MICROCOMPUTER BUILT-IN SYSTEM

[75] Inventor: Azuma Miyazawa, Tokyo, Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 752,746

[22] Filed: Nov. 21, 1996

Related U.S. Application Data

[63] Continuation of Ser. No. 247,071, May 20, 1994, abandoned.

[30] Foreign Application Priority Data

| May 24, 1993 | [JP] | Japan | 5-121079 |
| May 24, 1993 | [JP] | Japan | 5-121080 |
| May 24, 1993 | [JP] | Japan | 5-121081 |

[51] Int. Cl.[6] ............................................. G03B 7/00
[52] U.S. Cl. ..................................... 396/236; 396/300
[58] Field of Search ..................... 396/236, 300; 395/800

[56] References Cited

U.S. PATENT DOCUMENTS

| 4,423,934 | 1/1984 | Lambeth et al. . | |
| 4,737,814 | 4/1988 | Nakajima . | |
| 4,914,464 | 4/1990 | Azuma et al. . | |
| 5,278,604 | 1/1994 | Nakamura | 354/412 |
| 5,343,267 | 8/1994 | Kazumi | 354/410 |
| 5,371,567 | 12/1994 | Ishida et al. | 354/402 |
| 5,408,672 | 4/1995 | Miyazawa et al. | 395/800 |
| 5,442,553 | 8/1995 | Panillo | 364/424.04 |
| 5,448,442 | 9/1995 | Farog | 361/24 |
| 5,592,613 | 1/1997 | Miyazawa et al. | 395/182.04 |
| 5,687,345 | 11/1997 | Matsubara et al. | 395/430 |

FOREIGN PATENT DOCUMENTS

| 62-25733 | 2/1987 | Japan . |
| 1-201634 | 8/1989 | Japan . |
| 2-941 | 1/1990 | Japan . |
| 4-170797 | 6/1992 | Japan . |
| 4-291489 | 10/1992 | Japan . |

OTHER PUBLICATIONS

Nikkei Microdevices; May 1992; pp. 25–62.

*Primary Examiner*—Daniel P. Malley
*Attorney, Agent, or Firm*—Frishauf, Holtz, Goodman, Langer & Chick

[57] ABSTRACT

A CPU in a one-chip microcomputer executes a control operation in accordance with program data stored in part of a flash memory capable of erasing/writing data in each memory block defined in the flash memory. A write controller writes data in a specific block in the flash memory. A plurality of adjustment values for correcting variations between products in which the system is to be used are written in a specific block of the flash memory after the adjustment values are determined. A control program for rewriting data stored in the flash memory is written before the one-chip microcomputer is incorporated in the system. After the one-chip microcomputer is incorporated in the system, data is written in the flash memory through the write controller. In addition, the circuit configuration of the system is stored in part of the flash memory. When a program stored in the flash memory of the system is upgraded, an upgrading program is selected on the basis of the circuit configuration written in the flash memory by the write controller.

13 Claims, 22 Drawing Sheets

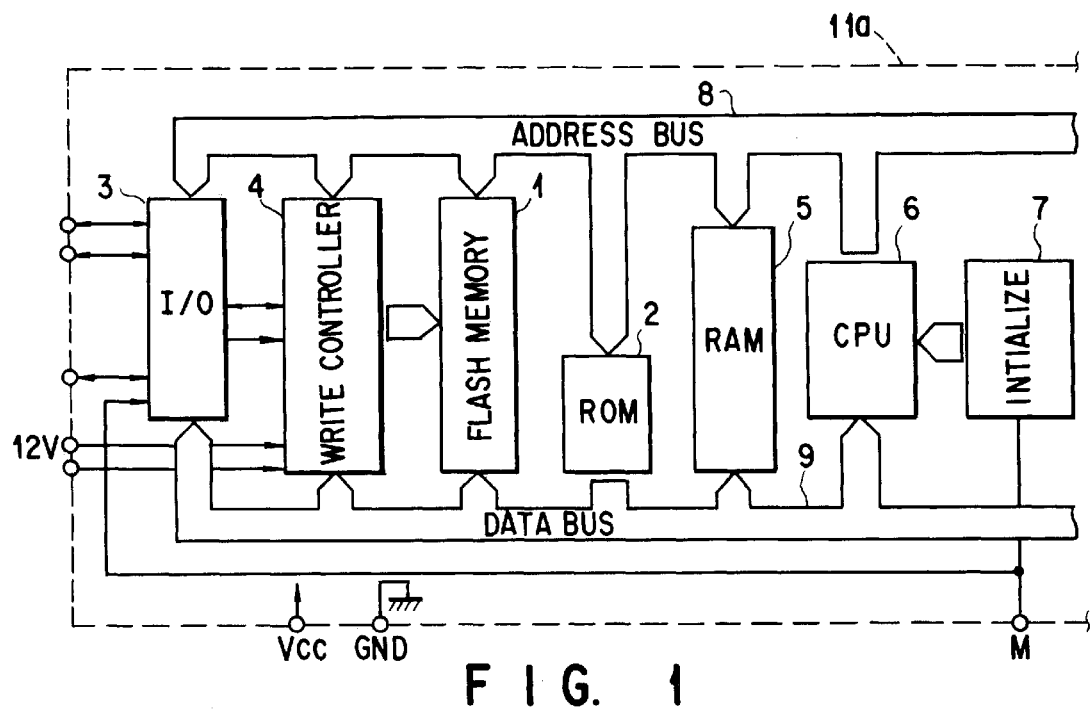
F I G. 1
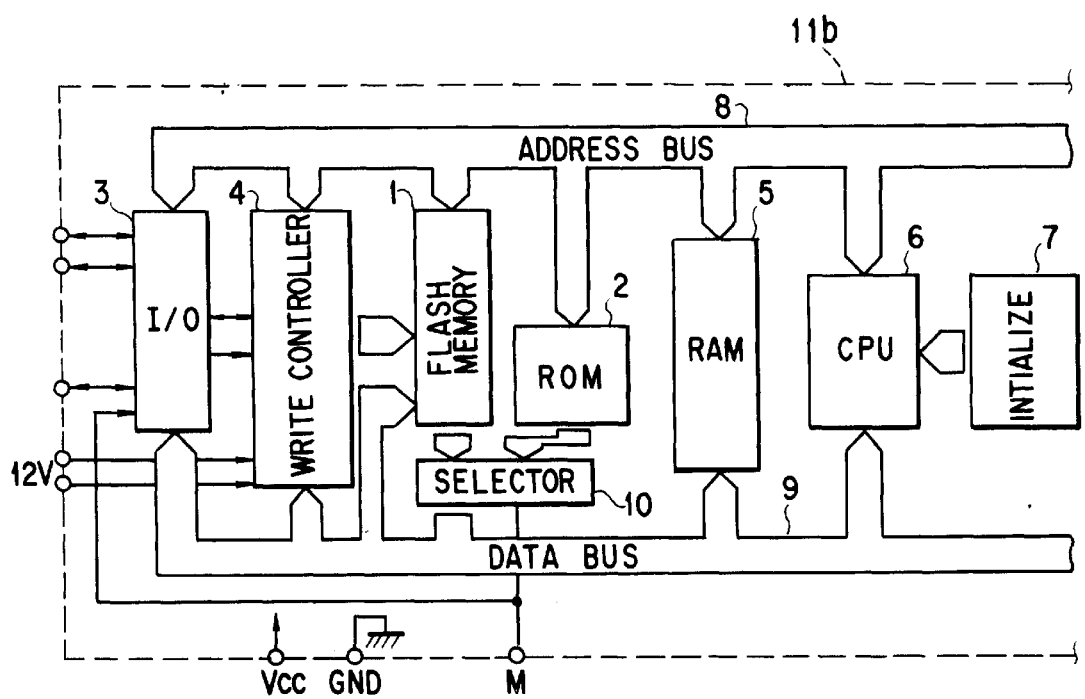
F I G. 2

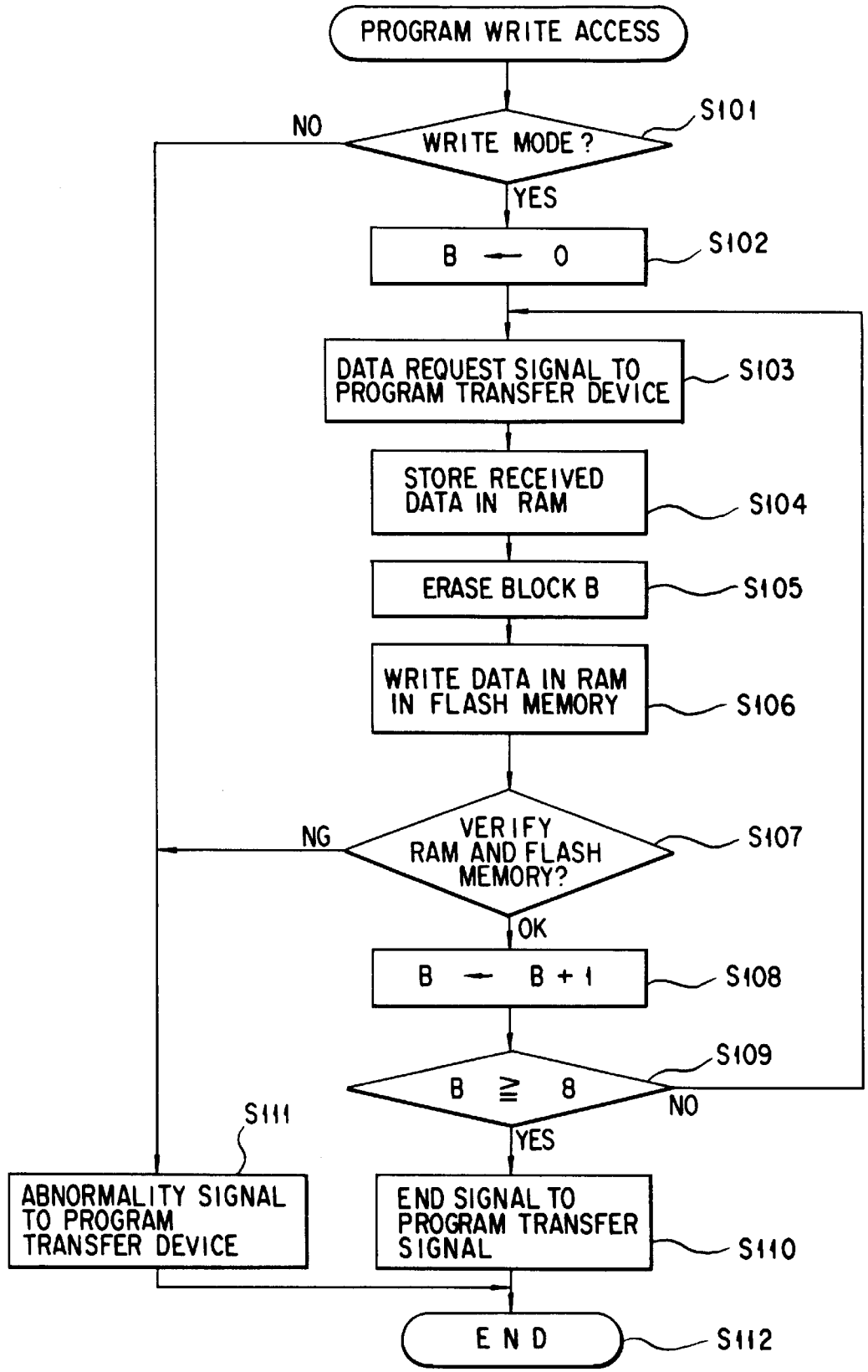
F I G. 5

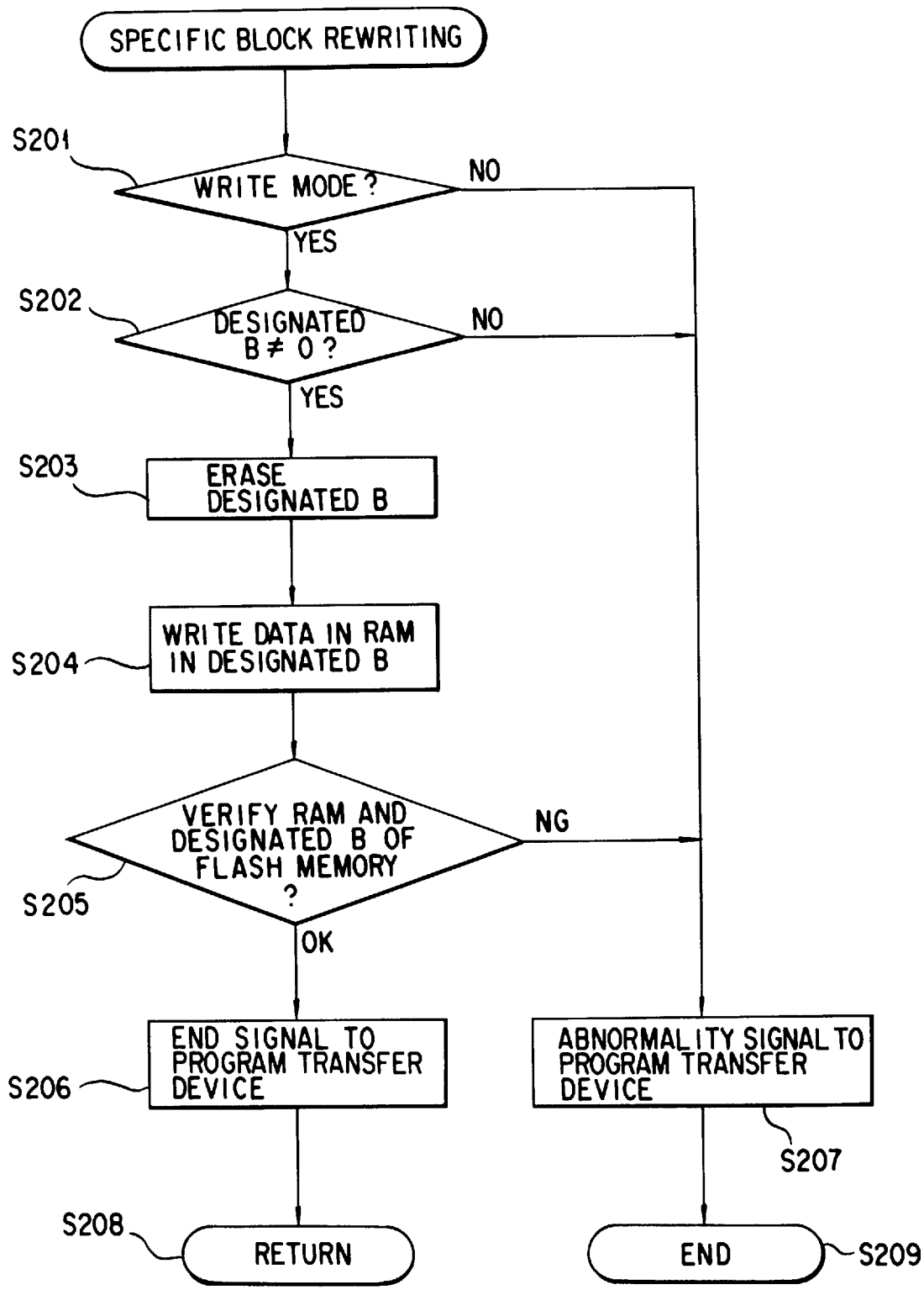
F I G. 6

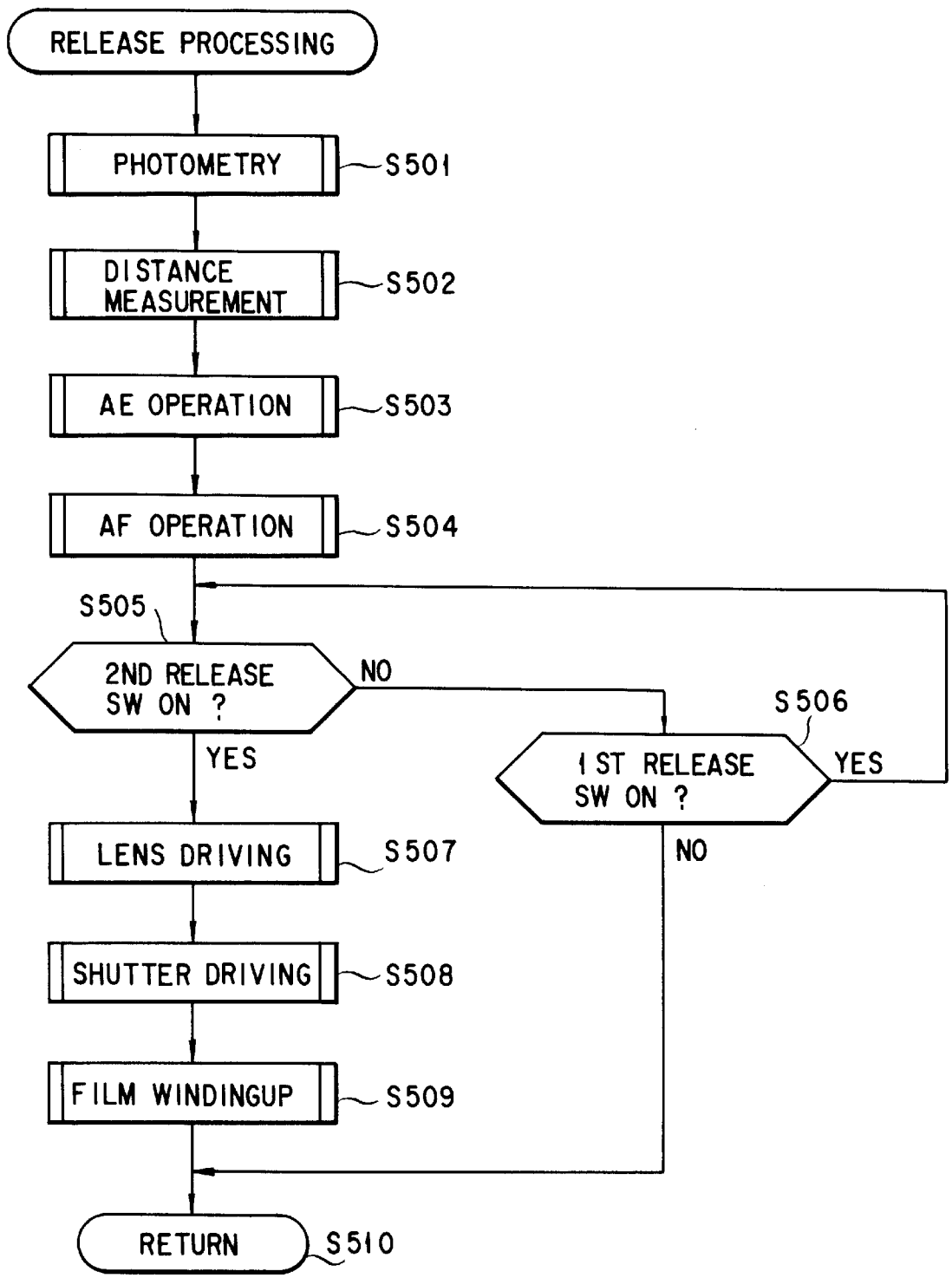
F I G. 10

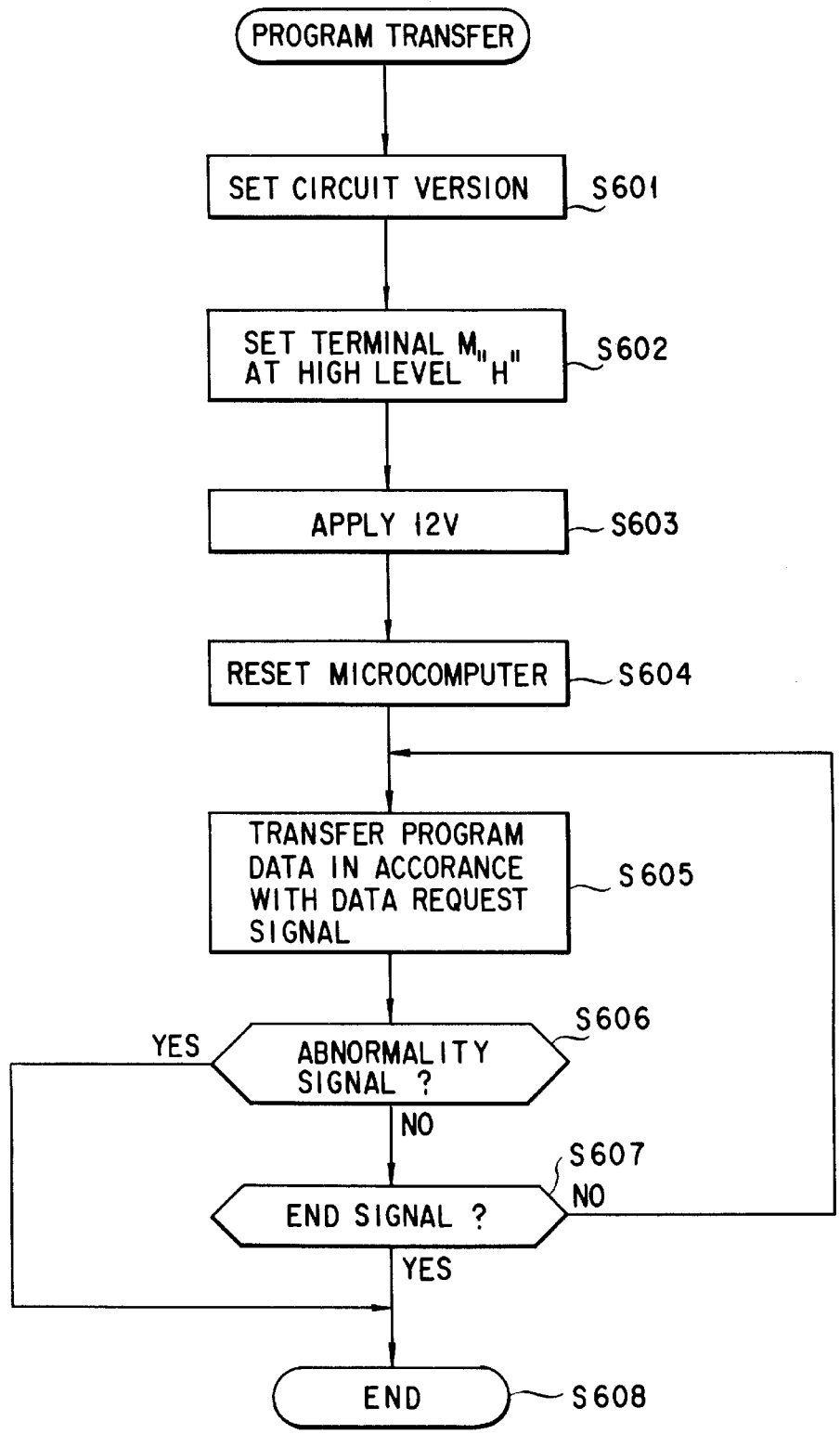
F I G. 13

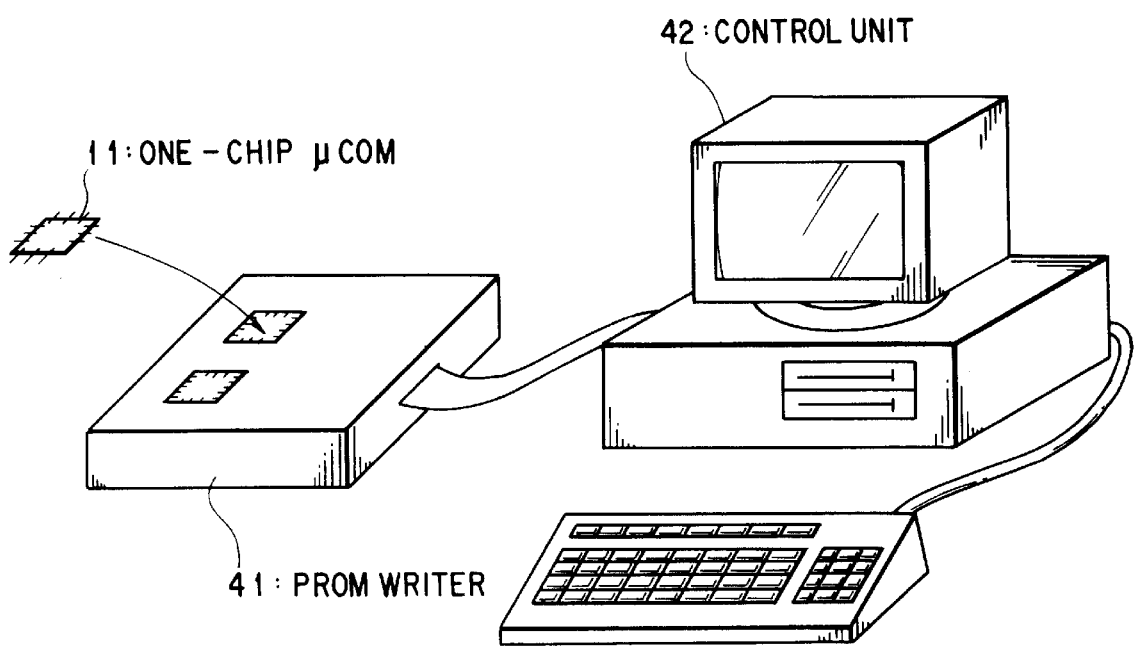
F I G. 15

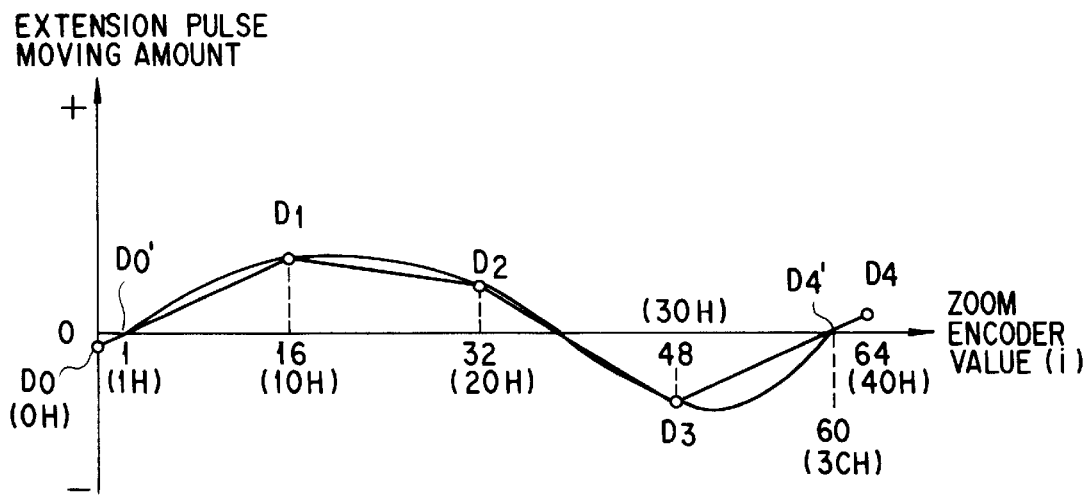
F I G. 17
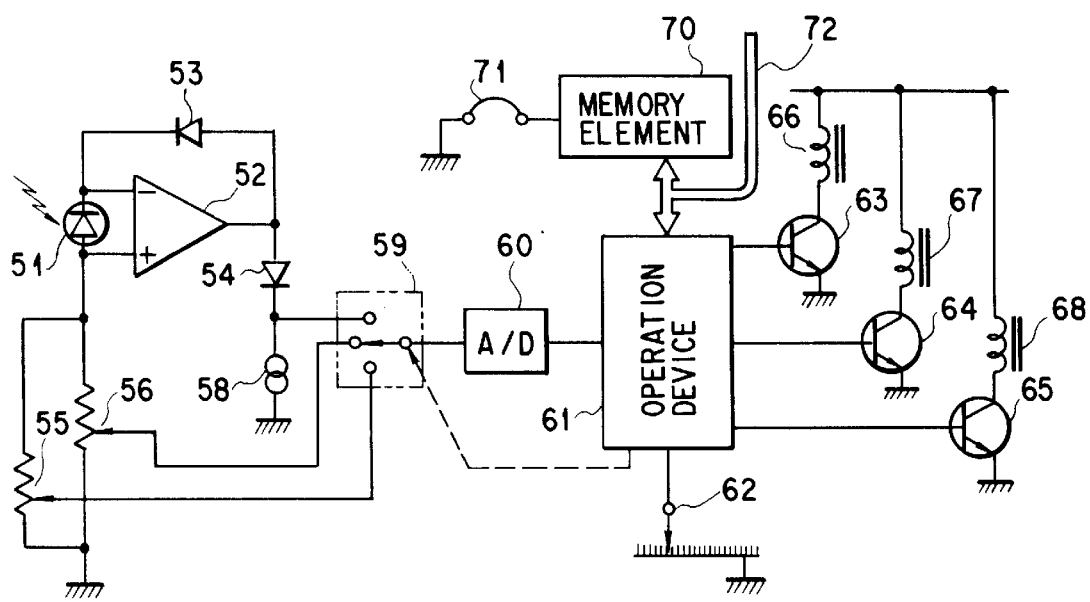
F I G. 18

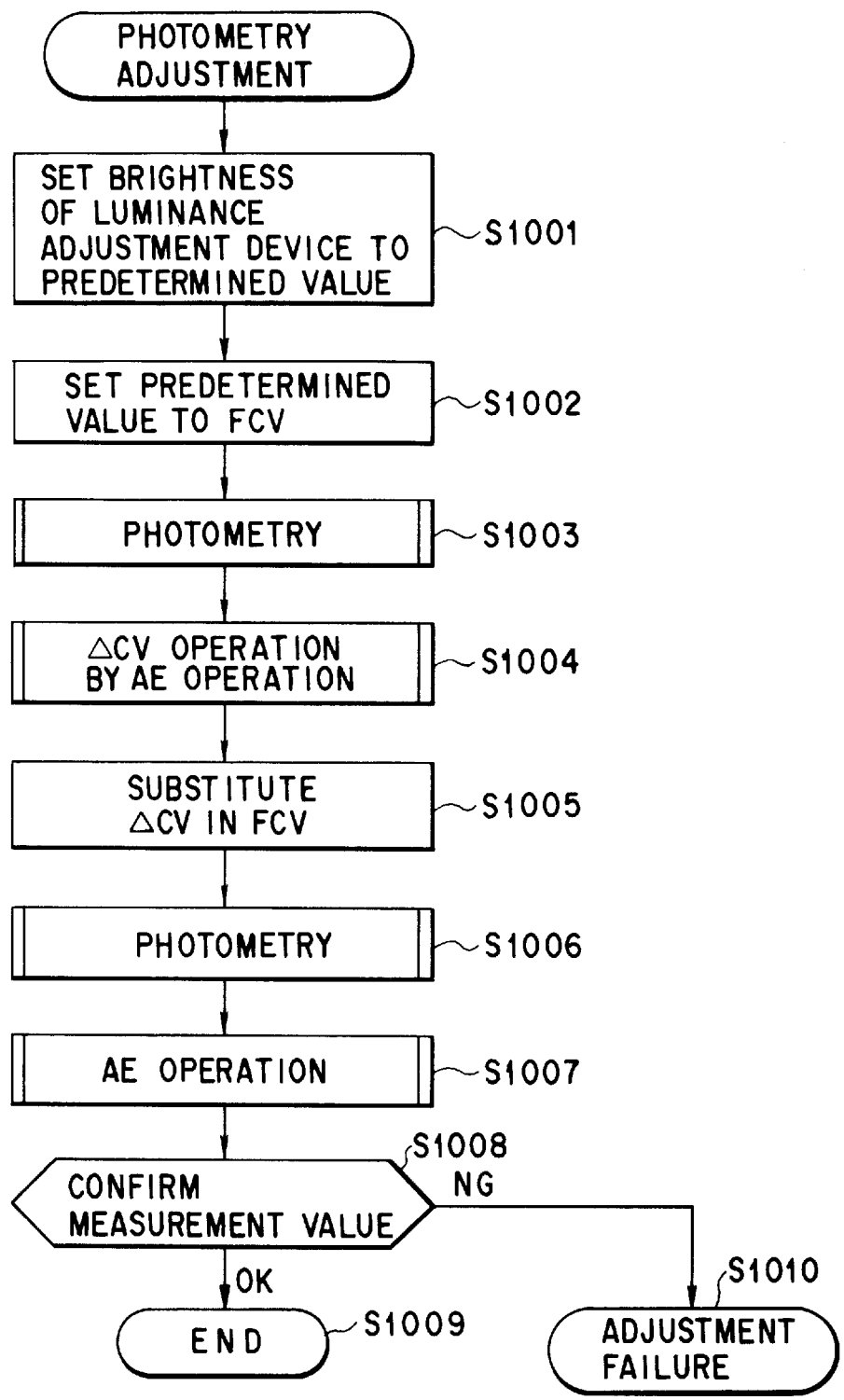
F I G. 20

| 8700 | 0 0 |
| 8701 | |

| 8700 | A 5 |
| 8701 | |

| | ADJUSTMENT PROGRAMMING MODE | PRODUCTION PROGRAMMING MODE |
|---|---|---|
| A F C 1 | 9001 | 8701 |
| A F C 2 | 9002 | 8702 |
| A F I N F | 9003 | 8703 |
| A E C 1 | 9004 | 8704 |
| A E C 2 | 9005 | 8705 |
| | | |
| PROGRAM NAME AFTER LINKING | CAMERA ADJ | CAMERA USE |
F I G. 25
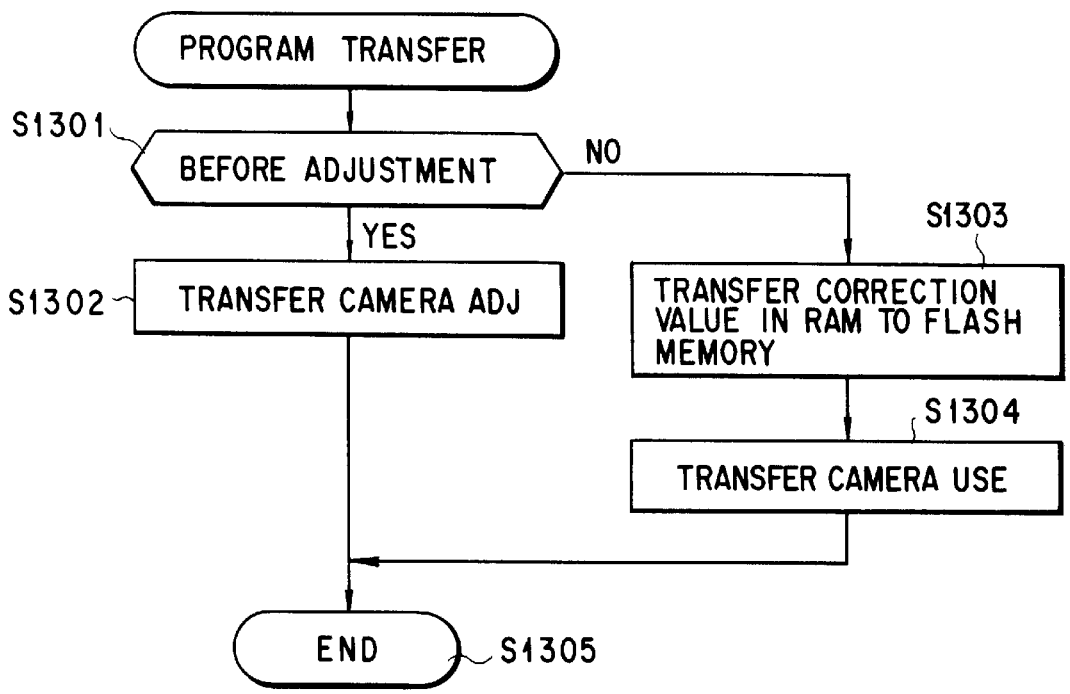
F I G. 26

ONE CHIP MICROCOMPUTER BUILT-IN SYSTEM

This application is a continuation of application Ser. No. 08/247,071, filed May 20, 1994, now abandoned.

BACKGROUND OF THE INVENTION

1. Field of the Invention

The present invention relates to a one-chip microcomputer built-in system and, more particularly, to a one-chip microcomputer built-in system which uses a microcomputer incorporating a flash memory.

2. Description of the Related Art

Conventional flash memories have been described in detail in, for example, "Nikkei Microdevices" (Special report "Ready for magnetic disk replacement for flash DRAM, May 1992, pp. 25–62).

A technique associated with a one-chip microcomputer (to be abbreviated as a 1-$\mu$COM hereinafter) incorporating a flash memory as a programming memory has already been presented by Hitachi as "H8/538F", and a technique for incorporating a flash memory in a 1-$\mu$COM has already been known.

The "H8/538F" also has a write controller for rewriting the contents of the flash memory by a program. Additionally, a program is likely to be written in the flash memory in the microcomputer mounted in a product.

On the other hand, Jpn. Pat. Appln. KOKAI Publication No. 4-291489 discloses a technique in which a loader program ROM is incorporated in addition to a flash memory, and using a ROM program, a main control. program is stored in the flash memory through a data communication device.

U.S. Pat. No. 4,423,934 discloses a technique in which a product is operated in predetermined conditions using a standard program, and a deviation from a standard value is obtained as a custom constant. Each product is programmed using this custom constant.

However, to rewrite the contents of a flash memory in a 1-$\mu$COM mounted in the product, a hardware write controller is required to rewrite the flash memory by program control.

In addition, although the above-described Jpn. Pat. Appln. KOKAI Publication No. 4-291489 discloses a technique in which data is sequentially written in blocks of the flash memory, no technique for rewriting only a specific block is disclosed. No technique for writing an adjustment value for variations between products in the flash memory is disclosed.

According to the technique disclosed in U.S. Pat. No. 4,423,934, it is necessary to remove the emulator from a camera after programming and mount a programmed 1-$\mu$COM (PROM) on the camera.

Furthermore, in the technique disclosed in Jpn. Pat. Appln. KOKAI Publication No. 4-291489, a program cannot be rewritten without a loader programming ROM after a 1-$\mu$COM is mounted in a product. On the other hand, Jpn. Pat. Appln. KOKAI Publication No. 4-170797 discloses a technique which allows to upgrade a program by using a 1-$\mu$COM incorporating a flash memory while it is mounted in a product.

However, to rewrite the contents of the flash memory in the microcomputer while the 1-$\mu$COM is mounted in a product, a hardware write controller is required to rewrite the flash memory by program control.

The above-mentioned Jpn. Pat. Appln. KOKAI Publication No. 4-170797 describes an updated circuit in a product. Although the upgraded circuit needs an appropriately upgraded program, there is no description of an upgraded program at all.

SUMMARY OF THE INVENTION

It is, therefore, an object of the present invention to provide a new and improved one-chip microcomputer built-in system in which, to adjust variations between products by a control program transferred to a flash memory, a specific block of the flash memory is used as an adjustment value area, programs for erasing the specific block and writing data are written in other blocks, the control program is written in the flash memory, and thereafter, data can be freely written in only the specific block, thereby allowing to store the programs and correction data even in the flash memory for only rewriting blocks, regardless of the rewrite time or count. The present invention has been made in consideration of the above problem, and has as another object to provide a one-chip microcomputer built-in system capable of writing adjustment data or upgrading a program even when a one-chip microcomputer having a flash memory with no program load ROM is mounted in a product.

The present invention has been made in consideration of the above problem, and has as still another object to provide a one-chip microcomputer built-in system capable of recording a circuit version in a flash memory at the time of manufacture and upgrading a program even when the circuit is upgraded after the one-chip microcomputer is mounted in a product.

According to one aspect of the present invention, there is provided a camera comprising: a camera body; a one-chip microcomputer incorporated in the camera body; means for outputting information for exposure control and focus adjustment of the camera body to the one-chip microcomputer; and an actuator driven when the microcomputer processes the information for exposure control and focus adjustment, the one-chip microcomputer comprising: a flash memory capable of storing a control program for driving the actuator; write means for writing the control program and data in the flash memory; and a communication terminal for performing communication with an external adjustment device, the external adjustment device transmitting an adjustment value used to control an operation of the actuator to the microcomputer, wherein the one-chip microcomputer writes the adjustment value transmitted from the external adjustment device during communication in an adjustment data write area as part of the flash memory by the write means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a view showing the arrangement of the first embodiment in which a basic rewrite program of a flash memory is held in a ROM;

FIG. 2 is a view showing the arrangement of the second embodiment in which an address is commonly used for a boot ROM and a flash memory;

FIG. 5 is a flow chart showing an operation of writing data in all blocks of the flash memory 1;

FIG. 6 is a flow chart showing an operation of a "specific block rewrite" program for rewriting only a specific block of the flash memory 1;

FIG. 10 is a flow chart showing an operation of a "release processing" subroutine;

FIG. 13 is a flow chart showing a program on a transfer device side when a program is to be transferred by the program transfer device after a product is assembled;

FIG. 15 is a view showing an example of program write access to the flash memory 1 before a 1-μCOM is mounted in the product;

FIG. 17 is a view for explaining zoom focusing correction in AF adjustment;

FIG. 18 is a view showing an example of photometric value adjustment using a nonvolatile memory;

FIG. 20 is a flow chart showing a program on the adjustment device side for forming photometric correction data as part of AF adjustment in the flash memory 1;

FIG. 25 is a view showing a method of rewriting the program before and after adjustment;

FIG. 26 is a flow chart showing a program of the program transfer device;

DETAILED DESCRIPTION OF THE PREFERRED EMBODIMENTS

Figures 3, 4:
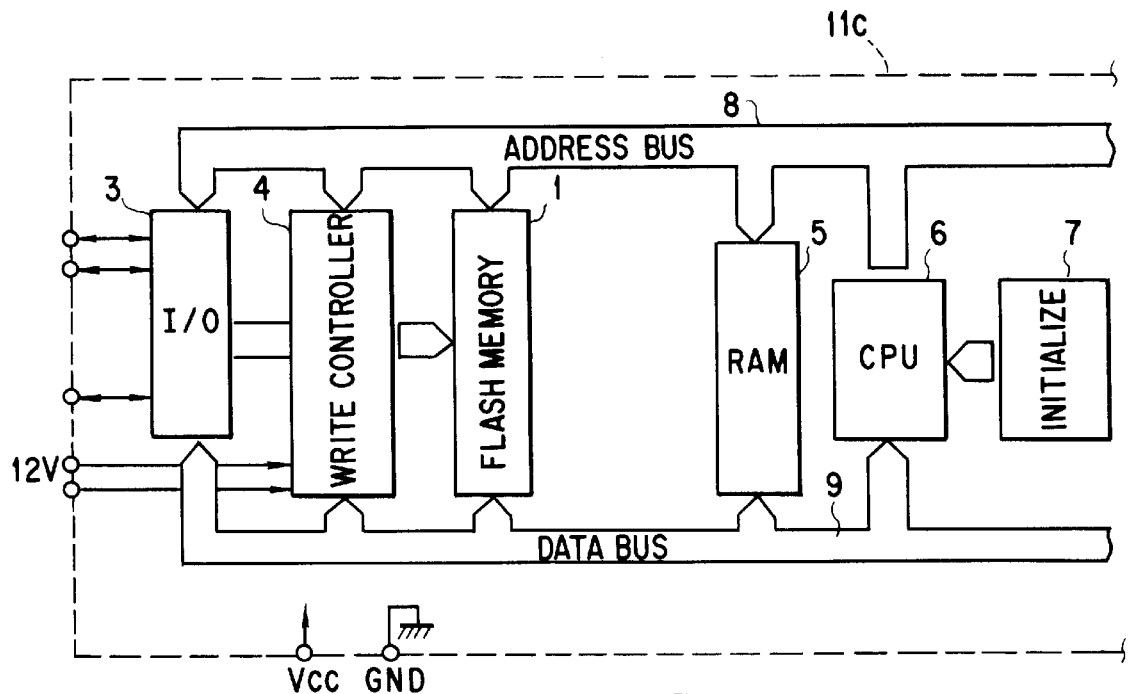
FIG. 3 is a view showing the arrangement of the third embodiment in which no boot ROM is included.
FIG. 4 is a view showing an address map of a flash memory 1 of a 1-μCOM 11.

Reference will now be made in detail to the presently preferred embodiments of the invention as illustrated in the accompanying drawings, in which like reference characters designate like or corresponding parts throughout the several drawings.

An embodiment of the present invention will be described below with reference to the accompanying drawings.

FIGS. 1 to 3 are views showing the internal arrangement of a one-chip microcomputer for rewriting a flash memory by a program in detail.

FIG. 1 is a view showing the arrangement of the first embodiment in which the basic rewrite program of a flash memory is held in a ROM.

In the first embodiment, the addresses of a flash memory 1 are different from those of a boot ROM (to be abbreviated as a ROM hereinafter) which stores a program for writing a control program or various data in the flash memory 1. A terminal M switches the program of the ROM 2 and the program of the flash memory 1 to be executed. More specifically, in this embodiment, when a one-chip microcomputer 11 (to be referred to as a 1-μCOM hereinafter) is reset, an initializing unit 7 for a CPU 6 determines an address after the reset start and whether the program of the ROM 2 or the program of the flash memory 1 is executed. The terminal M is also connected to an I/O circuit 3 to determine which mode is set by the program. A voltage applying terminal 12V is used to rewrite the flash memory 1. A step-up circuit may be provided in a 1-μCOM 11a to step up the voltage from a terminal Vcc to the terminal 12V. However, since the step-up circuit requires a large area in the 1-μCOM 11a, the voltage is preferably externally applied as in this embodiment. In addition to the terminal 12V, a terminal for externally allowing the operation of a write controller 4 is also connected to the write controller 4. This terminal for allowing the operation of the write controller 4 may also be used as an I/O terminal to be connected to the write controller 4. The write controller may also be operated by only a program without a control terminal.

FIG. 2 is a view showing the arrangement of the second embodiment in which an address is commonly used for a boot ROM and a flash memory.

In the second embodiment, both a flash memory 1 and a boot ROM 2 are accessed upon power-ON reset. A selector 10 is switched by a terminal M (i.e., permitting means) to output data in the flash memory 1 or the boot ROM 2 onto a data bus 9.

FIG. 3 is a view showing the arrangement of the third embodiment in which no boot ROM is included. In the third embodiment, no data can be written in a flash memory 1 after a 1-μCOM is mounted in a product. However, when at least a boot program (to be described later) is written by a ROM writer before mounting, this program can be used to rewrite a program in the flash memory 1 even after the 1-μCOM is mounted in a product.

Referring to FIGS. 1 to 3, reference numerals 8 and 9 denote an address bus and a data bus, respectively.

FIG. 4 is a view showing an address map of the flash memory of the above-described 1-μCOM 11. The flash memory 1 is characterized in that data can be erased or written, i.e., rewritten in each block. In the example shown in FIG. 4, the flash memory 1 is divided into blocks 0 to 7 (to be abbreviated as B0 to B7 hereinafter). Although the memory capacity is set at various values of, e.g., 8 or 1 Kbytes, or 512, 256, or 128 bytes, for each block, a predetermined value, e.g., 8 Kbytes may be set.

The embodiment in which the flash memory is used will be further described below. When a block rewrite nonvolatile memory is used, any memory other than the flash memory 1 can be effectively used, as a matter of course. In the following description, the 1-μCOMs 11 in the first to third embodiments shown in FIGS. 1 to 3 are referred to as a 1-μCOM 11a, a 1-μCOM 11b, and a 1-μCOM 11c, respectively.

FIG. 5 is a flow chart showing an operation of writing data in all the blocks of the flash memory 1. In the 1-μCOM 11a or 11b having the ROM 2, this program must be present in the ROM 2. However, this program cannot be used in the 1-μCOM 11c. This is because the rewrite program itself is also rewritten in the 1-μCOM 11c. In the 1-μCOM 11a or 11b, this program is executed after a reset operation.

When this program is executed, the terminal M (in the 1-μCOM 11a or 11b), the terminal 12V, and the other control terminals are confirmed to check whether a write mode is set (step S101). If NO in step S101, an abnormality signal is sent to a program transfer device 19 (FIG. 7) to end the processing (steps S111 and S112).

If YES in step S101, the first program (B0) in the flash memory 1 is designated (step S102). A data request signal is output to the program transfer device 19 (step S103). When program data is transferred from the program transfer device 19, this data is received and stored in a predetermined storage area of a RAM 5 in the 1-μCOM (step S104). After the designated block of the flash memory 1 is erased (step S105), the data stored in the RAM 5 is written in the designated block of the flash memory 1 (step S106). After this data is written, the contents of the RAM 5 and the flash memory 1 are verified (step S107). If the verification result is "OK", the designated block is incremented to confirm whether the processing of the last block is completed. If the processing of the last block is not completed, the above steps are repeated (steps S108 and S109). When the processing of the last block is completed, an end signal is output to the program transfer device 19 (step S110) to end the program write access (step S112). If the verification result is "NG" in step S107, an abnormality signal is output to the program transfer device 19 to end the program (steps S111 and S112).

FIG. 6 is a flow chart showing an operation of a "specific block rewrite" program for rewriting only a specific block of the flash memory 1.

This program is written in the ROM 2 or the flash memory 1 in the 1-μCOM 11a or 11b. However, in the 1-μCOM 11c, this program is written by the ROM writer before the 1-μCOM 11c is mounted in the product. In this case, the program is written in B0. Note that the program is written in B0 of the flash memory 1 when the ROM 2 is not included in the 1-μCOM 11a or 11b. This program is executed in accordance with a subroutine call from the program transfer device 19 by a "checker communication" subroutine (to be described later).

When this program is executed, it is checked whether a write mode is designated (step S201). If YES in step S201, it is subsequently checked whether the designated block is "0" (step S202). This operation inhibits (via an inhibiting means) the subroutine for rewriting a specific block, which is written in the designated block 0, from being rewritten. If NO in step S202, data in the designated block is erased (step S203), data in the RAM 5 is written in the designated block (step S204), and the RAM and the designated block of the flash memory 1 are verified (step S205). If the verification result is "OK", an end signal is output to the program transfer device 19 (step S206), and the flow returns to the main routine (step S208).

On the other hand, if NO in step S201, YES in step S202, or the verification result of the RAM 5 and the designated block of the flash memory 1 is "NG", an abnormality signal is output to the program transfer device 19 (step S207) to end this program (step S209).

As described above, the "specific block rewrite program" is different from the "program write" program shown in FIG. 5 in that the former rewrites only the block which is designated before reception of a call. However, B0 which stores this program is inhibited from being rewritten. The reason for this is as follows. When B0 is to be rewritten and the designated B is erased, the program in execution is erased to make B0 nonrewritable. After rewrite access, the program is ended to return to the "checker communication" subroutine. In this case, the "specific block rewrite" program is written in B0. However, this program can also be written in any other block, as a matter of course.

Figure 7:
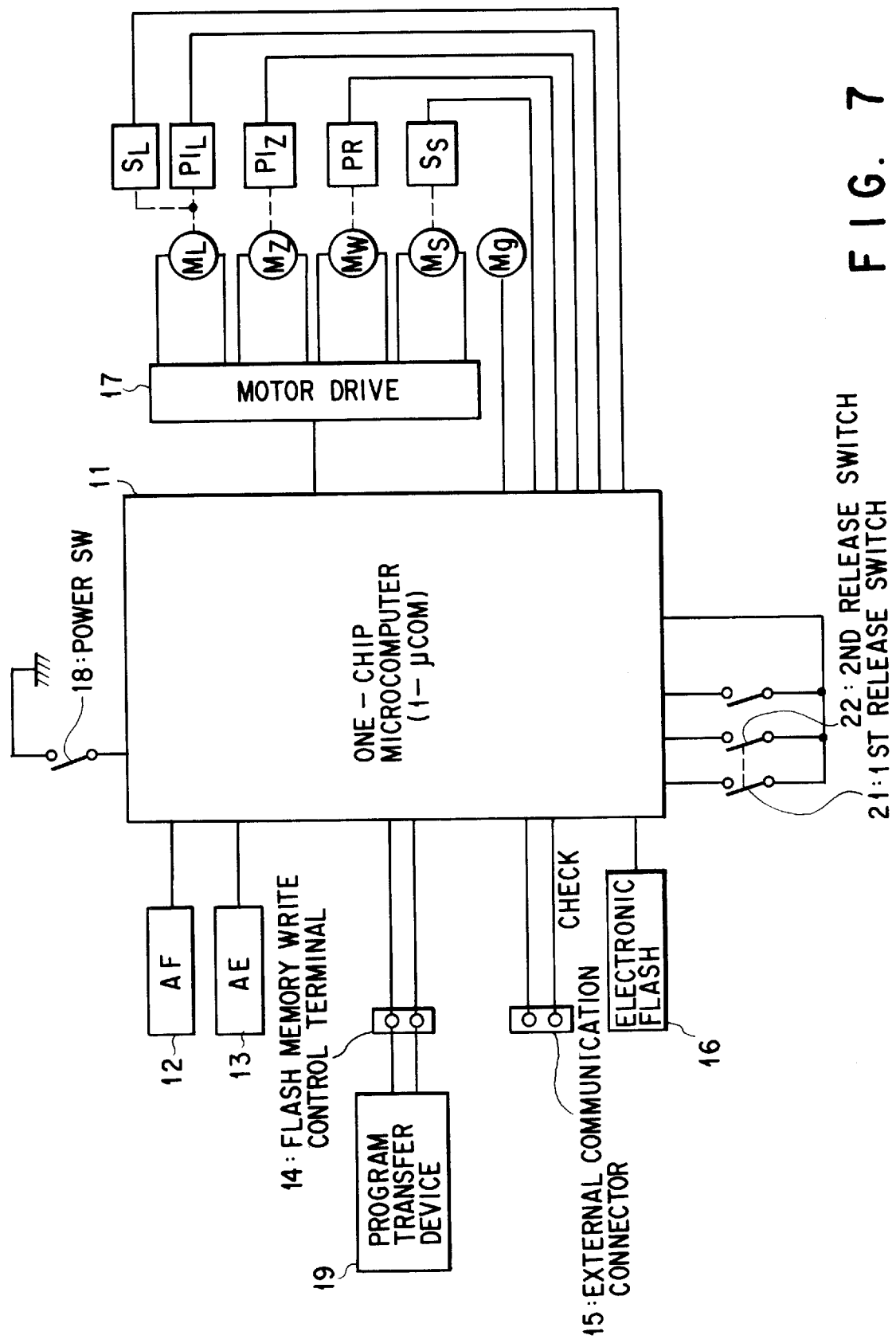
FIG. 7 is a block diagram showing the arrangement of a camera to which a one-chip microcomputer built-in system of the present invention is applied.

FIG. 7 is a block diagram showing the arrangement of a camera to which a one-chip microcomputer built-in system of the present invention is applied.

Referring to FIG. 7, the 1-μCOM 11 for executing sequence control of the camera has the flash memory 1 which can be rewritten by program control. The 1-μCOM 11 is connected to an AF circuit 12 for measuring the distance to an object, an AE circuit 13 for measuring the brightness of an object, a flash memory write control terminal 14 for connecting the program transfer device 19, an external communication connector 15 for connecting a camera adjustment device and a device for writing ROM correction data, and an electronic flash 16 for performing an electronic flash charging operation and light emission.

The flash memory write control terminal 14 includes the above-described terminals M and 12V, and other terminals. The flash memory write control terminal 14 and the external communication connector 15 may be used as a common connector.

The 1-μCOM 11 is connected, via a motor driver 17 to driving various motors, a motor $M_L$ for driving a focus lens, a motor $M_Z$ for driving a zoom lens, a motor $M_W$ for winding/rewinding a film, a motor $M_S$ for driving a shutter, and a magnet $M_g$ for closing the shutter. The motors $M_L$, $M_Z$, $M_W$, $M_S$ and the magnet $M_g$ comprise an actuator means.

In addition, the 1-μCOM 11 is connected to a switch $S_L$ for detecting the initial position of the focus lens, a photointerruptor $PI_L$ for detecting the unit driving amount (position) of the focus lens, a photointerruptor $PI_Z$ for detecting the position of the zoom lens, a photoreflector $P_R$ for detecting perforations of a film, and a switch $S_S$ for detecting the initial position of the shutter.

Furthermore, the 1-μCOM 11 is connected to various switches, i.e., a power switch 18, a first (1st) release switch (SW) 21, and a second (2nd) release switch (SW) 22. Note that the 1st release switch 21 and the 2nd release switch 22 constitute a two-stroke switch. That is, the 1st release switch 21 is turned on at the first stroke position, and the 2nd release switch 22 is turned on at the second stroke position.

Figure 8:
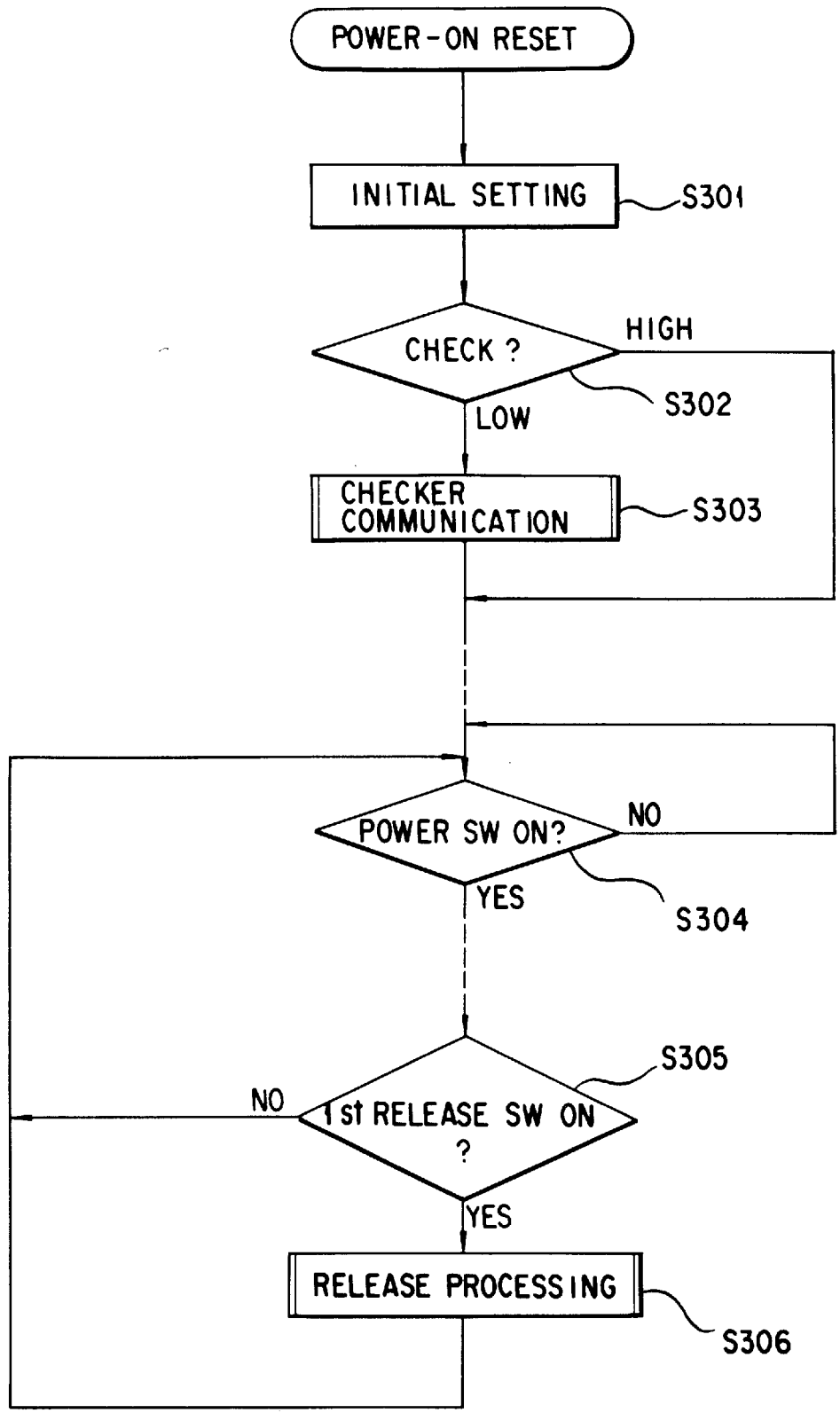
FIG. 8 is a flow chart showing an operation of the camera shown in FIG. 7.

An operation of this camera will be described below with reference to the flow chart in FIG. 8.

When a battery (not shown) is loaded into a camera, the ports and the like of the 1-μCOM 11 are initialized (step S301). It is checked whether the CHECK terminal is set at high level "H" or low level "L". If it is set at "L", the "checker communication" subroutine (to be described later) is executed (steps S302 and S303).

If the power switch 18 is ON, the control of the camera waits until the 1st release switch 21 is depressed. When the 1st release switch 21 is depressed, a "release processing" subroutine (to be described later) is executed. If the power switch 18 is OFF, the control is in a standby state until the power switch 18 is turned on. Other detailed processes are not particularly associated with the present invention, and a detailed description thereof will be omitted (steps S304 and S305).

Figure 9:
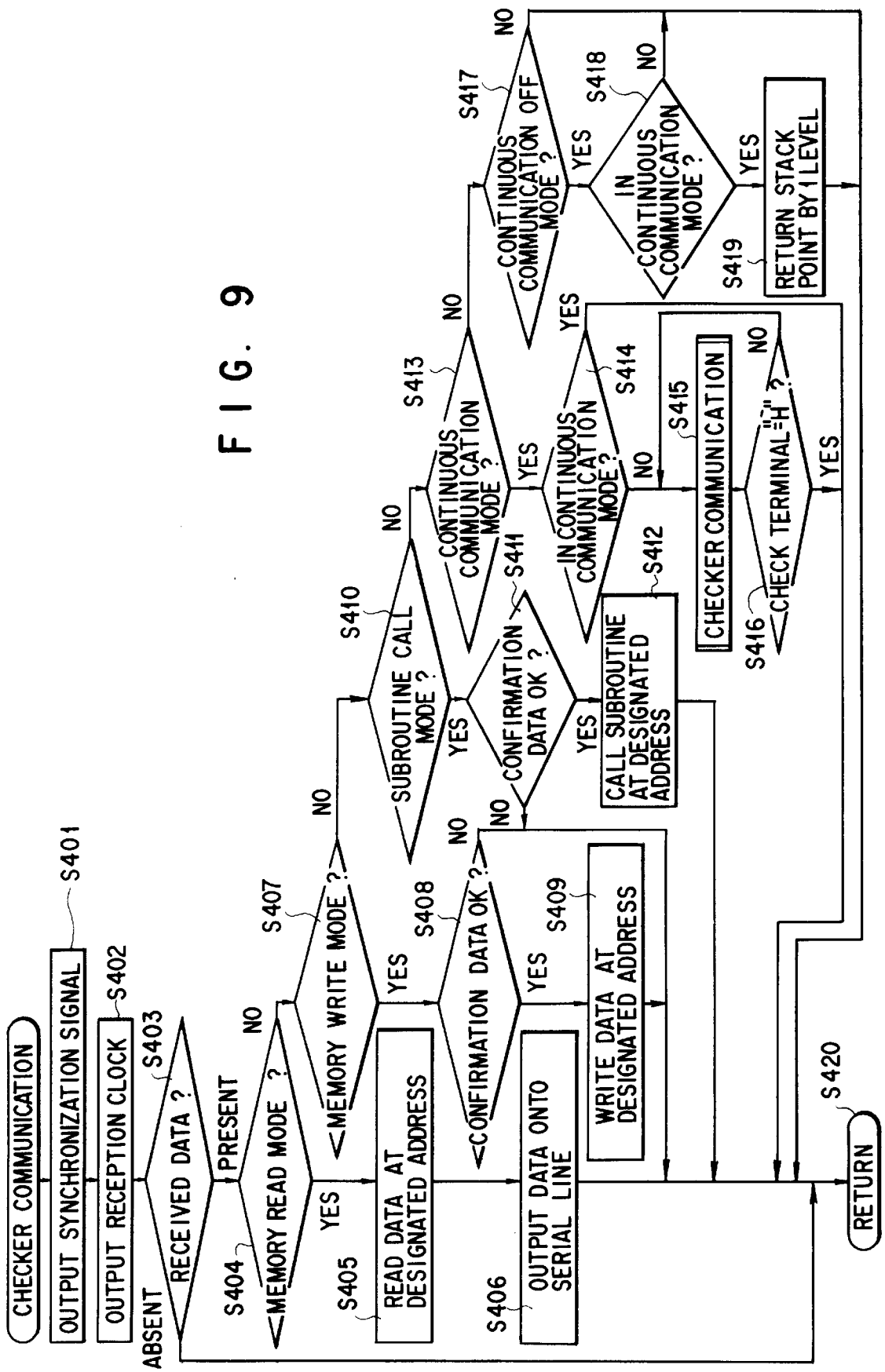
FIG. 9 is a flow chart showing an operation of a "checker communication" subroutine.

An operation of the "checker communication" subroutine will be described with reference to the flow chart in FIG. 9. Since the "checker communication" subroutine is disclosed in Jpn. Pat. Appln. KOKAI Publication No. 2-941 assigned to the same assignee as the present application, a detailed description will be omitted, and only its concept will be described below.

The 1-μCOM 11 outputs a synchronization signal and serial communication clocks to an external device (steps S401 and S402) and receives data from the external device (step S403).

In this case, if no data is received, the flow ends. If data is received from the external device, a memory mode is checked (step S404). If the memory mode is a read mode, the contents of the received data are interpreted, and data at the designated address in the 1-μCOM 11 is read (step S405). Thereafter, the read data is output onto a serial line (step S406), and the flow returns to the main routine.

If the memory mode is a write mode (step S407), confirmation data is checked (step S408). If the checking result is good, data is written at the designated address (step S409). If a subroutine call mode is detected (step S410), confirmation data is checked (step S408). If the checking result is good, a subroutine at the designated address is called (step S412) and is executed.

Furthermore, if a continuous communication mode for performing only a communication with the external device is detected (step S413), it is checked if the continuous communication mode is being executed (step S414). If NO in step S414, the checker communication is performed again (step S415). Thereafter, the "checker communication" is performed until the CHECK terminal goes "H" (step S416). If an OFF mode for interrupting a continuous communication is detected (step S417), it is checked if the continuous communication mode is being executed (step S418). If YES in step S418, the stack pointer is returned by one level (step S419). By using this checker communication, the "specific block rewrite" program can be executed, or camera adjustment (to be described later) can be performed.

An operation of the "release processing" subroutine executed by the camera will be described below in detail with reference to the flow chart in FIG. 10.

When this program is executed, photometry is performed to measure the brightness of an object (step S501). Thereafter, distance measurement is performed to measure the distance to the object (step S502). In the AE operation, data in the flash memory for correcting variations in the photometric value between cameras is used to correct the photometric value to a normal photometric value on the basis of the measured photometric value (step S503). In the AF operation, data in the flash memory 1 for correcting variations between cameras is used to correct the driving amount of the focus lens to an appropriate value for each camera (step S504).

The 2nd release switch 22 is then checked. If the 2nd release switch 22 is OFF, the control waits until the 2nd release switch 22 is turned on. If the 1st release switch 21 is turned off during the OFF state of the 2nd release switch 22, the processing is ended (steps S505 and S506). If the 2nd release switch 22 is turned on, the focus lens is driven by lens driving to open the shutter and wind a film, thus ending the processing (steps S507 to S510).

Figure 11:
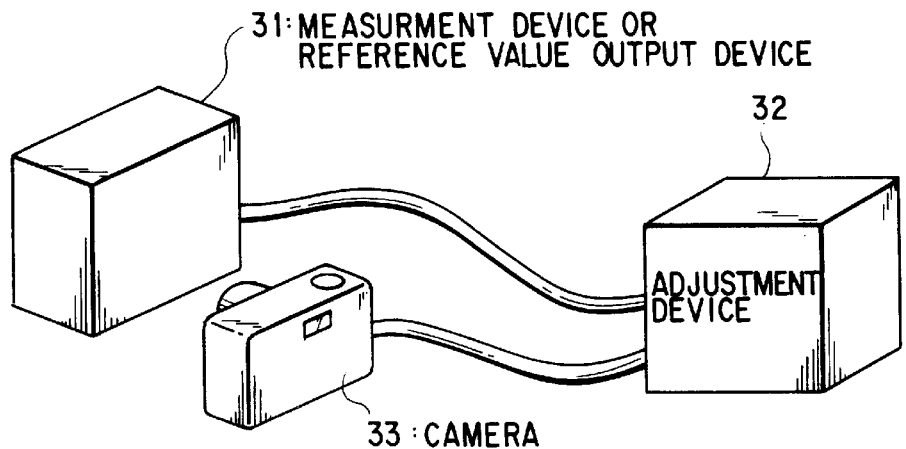
FIG. 11 is a view of the image of adjustment of variations between cameras.

FIG. 11 is a view of the image of adjustment of variations between cameras. As shown in FIG. 11, a camera 33 is connected to an adjustment device 32 through the external communication connector. A measurement device or reference value output device 31 is also connected to the adjustment device 32. In AF adjustment, an optical signal corresponding to the measured distance is output, and in AE adjustment, an adjustment specific luminance is output.

Figure 12A:
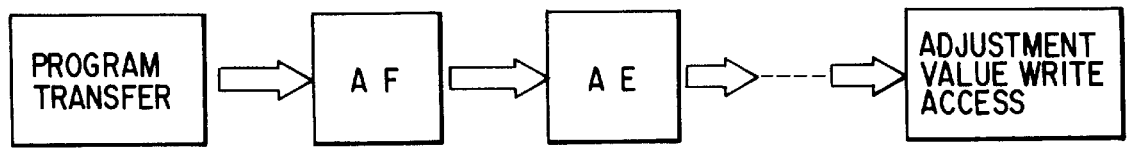
FIGS. 12A and 12B are views of the images of the production adjustment lines of the cameras.
Figure 12B:
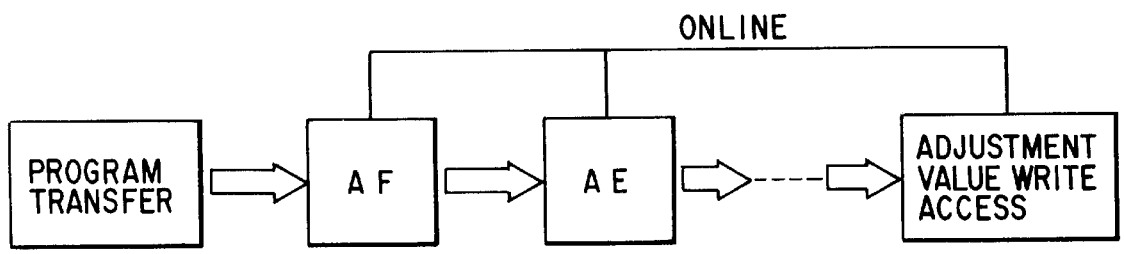

FIGS. 12A and 12B are views of the images of the production adjustment lines of a camera.

Referring to FIG. 12A, the program transfer device 19 transfers a control program for operating the camera or an adjustment program used in a combination with the adjustment device to the flash memory 1 of the 1-μCOM 11 in the camera. After the AF and AE adjustment operations, latest correction data, which comprises various data, is written in the flash memory 1 by an adjustment value write device. The correction data until completion of the adjustment is temporarily stored in the RAM 5 (to be described later) in the 1-μCOM and finally written at once. In this case, adjustment is continuously performed while a battery is loaded into the camera, or even when the battery is removed, next adjustment waits until the 1-μCOM 11 in the camera is set in a standby state. With these operations, data in the RAM 5 in the 1-μCOM 11 is not destroyed because the data can be backed up for a short period of time by an internal filter capacitor.

FIG. 12B is a view of the image of the adjustment line when data in the RAM 5 in the 1-μCOM 11 may be destroyed. After start of the adjustment, the adjustment device is connected online. The correction data is received online and finally written in the flash memory 1. In this case, even when the contents of the RAM 5 are destroyed, the correction data can be written for each camera.

FIG. 13 is a flow chart showing a program on the transfer device 19 side when a program is transferred by the program transfer device 19. Note that FIG. 13 is a flow chart when the 1-μCOM 11a or 11b is mounted as the 1-μCOM 11 on the camera body side.

When this "program transfer" program is executed, the circuit version of a product is set (step S601). This is because, in the 1-μCOM 11 having the flash memory 1, the program can be easily upgraded by exchanging the program even when a program bug is detected later. However, a problem can be detected in the circuit of a product, and the circuit is often upgraded from the beginning of production. Therefore, even when a bug is detected, the program cannot be simply exchanged and must be upgraded in accordance with the upgraded circuit. For this reason, data of the circuit version must be stored in part of the flash memory 1 in the 1-μCOM 11 of the product. This is described in detail in U.S. Ser. No. 209,834 assigned to the same assignee as the present application.

After the circuit version is set, the terminal M is set at "H", i.e., a program write mode (step S602). A voltage of 12 V is applied, and as needed, other control terminals are also set at the write mode (step S603). When the 1-μCOM 11 is reset (step S604), the "program write" program in the ROM 2 in the product is executed. Data is transferred in accordance with designation and written in the flash memory 1 (step S605).

The above-described "program transfer" program rewrites all program data at once. Another embodiment in which program data is rewritten in units of blocks will be described below.

Figure 14:
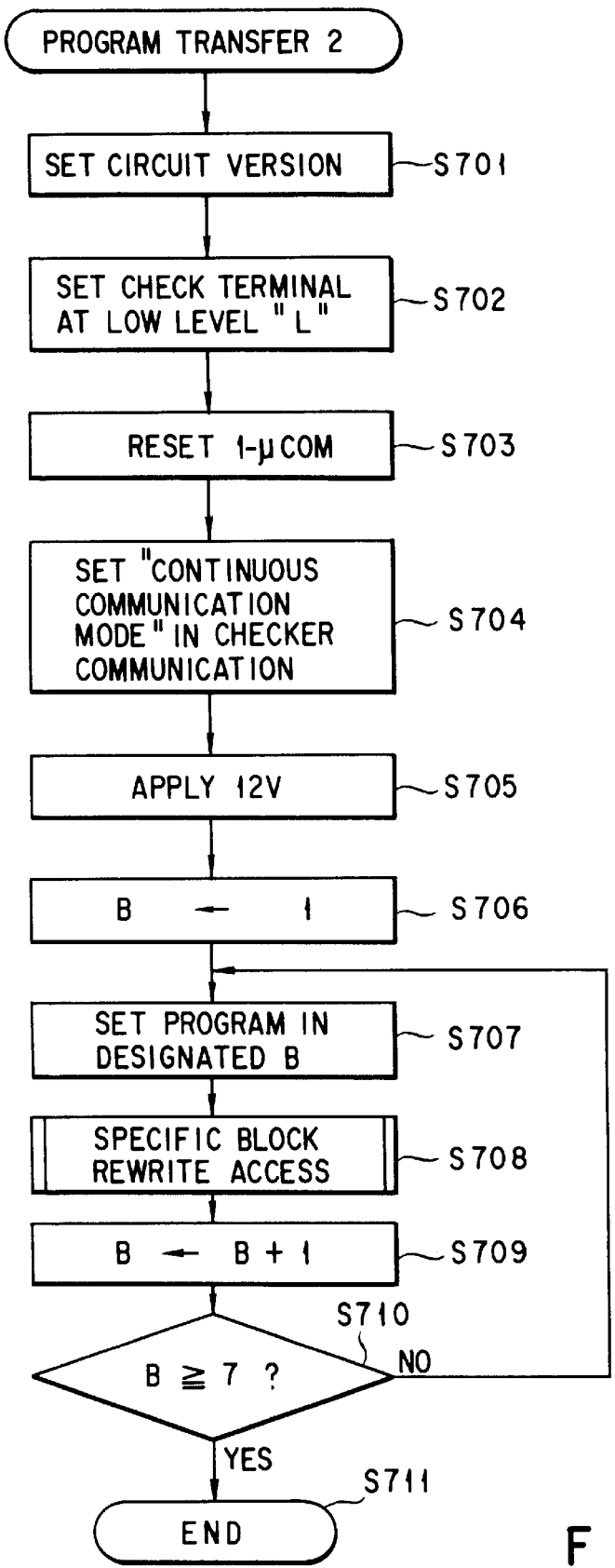
FIG. 14 is a flow chart showing an example of data write access to the flash memory 1 when a "specific block rewrite" program is executed by a μCOM 11a, 11b, or 11c.

FIG. 14 is a flow chart showing an example of data write access to the flash memory 1 when the "specific block rewrite" program is executed. In the 1-μCOM 11, this program must be written by the ROM writer before the 1-μCOM is mounted in the product. When the ROM 2 of the 1-μCOM 11a or 11b does not have this program, this program must be written using the ROM writer or the "program transfer" subroutine in advance.

When this program is executed, the circuit version of a product is set (step S701). The CHECK terminal of the product is set to "L" (step S702) to reset the 1-μCOM 11 (step S703). The operation of the "checker communication" subroutine is started, and a continuous communication mode is set to perform the following operations (step S704).

A voltage of 12 V is applied, and as needed, other write control terminals are also set at the write mode (step S705). The program is written in each block starting from B1 subsequent to the block of the flash memory 1, which stores the "program transfer 2" program. After the program for operating the camera is written in all the blocks, the program is ended (steps S706 to S711). Note that the program need not to be written in B7 serving as an adjustment data area.

FIG. 15 shows an example of program write access to the flash memory 1 before the 1-μCOM 11 is mounted in the product. The 1-μCOM 11 is set in a PROM writer 41, and a control unit 42 performs control of program write access to the 1-μCOM 11.

Figure 16B:
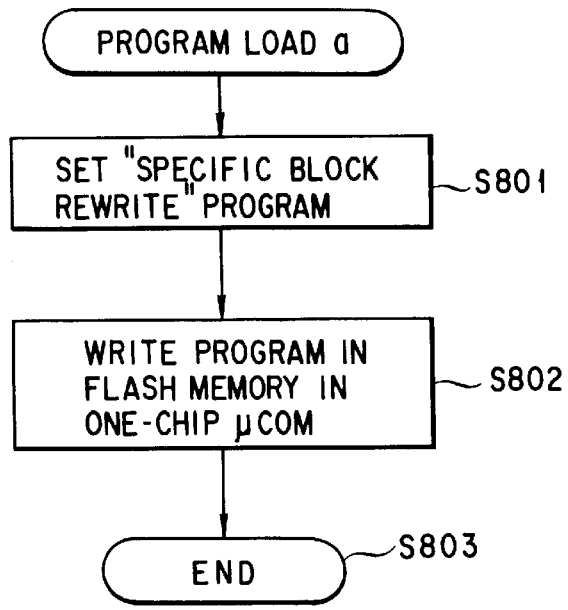
FIGS. 16A and 16B are flow charts showing operations of writing a program of a control unit 42.
Figure 16A:
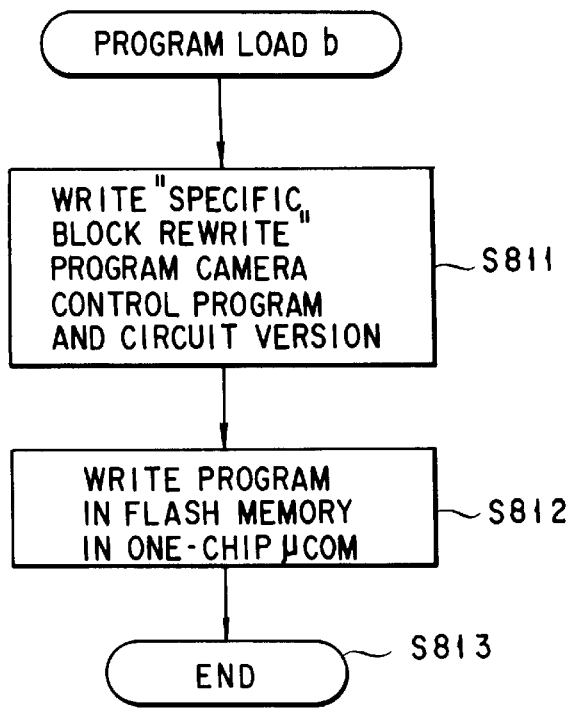

FIGS. 16A and 16B are flow charts showing the program write operations of the control unit 42. FIG. 16A is a flow chart showing a sequence when only the "specific block rewrite" subroutine (i.e. program) is to be loaded. In this case, after the microcomputer is mounted in a camera, a camera control program is written in the flash memory 1 using a method shown in FIG. 14 (steps S801 to S803). FIG. 16B is a flow chart showing a sequence when a camera control program is also to be written in advance. In this case, after the 1-μCOM 11 is mounted in a camera, no program need to be written in the flash memory 1. Therefore, program transfer in the first step shown in FIG. 12A or 12B is omitted (steps S811 to S813).

Zoom focusing correction in AF adjustment will be described below with reference to FIG. 17.

This zoom focusing correction is described in detail in Jpn. Pat. Appln. KOKAI Publication No. 1-201634 (corresponding to U.S. Pat. No. 4,914,464) and will be briefly described below.

Referring to FIG. 17, a zoom encoder value (0H: wide-angle side; 40H: telephoto side) is plotted along the abscissa, and a focus lens extension pulse correction value with respect to a reference focus position at each zoom position in an infinity focus mode is plotted along the ordinate. The focus lens extension pulse correction values are stored in a nonvolatile memory as correction values D0 to D4 with respect to the zoom encoder values at intervals of 10H.

When the camera is actually used, the focus lens reference extension amount is added to the correction value and converted into a focus lens extension amount in which variations between cameras are corrected. Note that this operation is used in the "AF operation" subroutine in FIG. 10.

Figure 19:
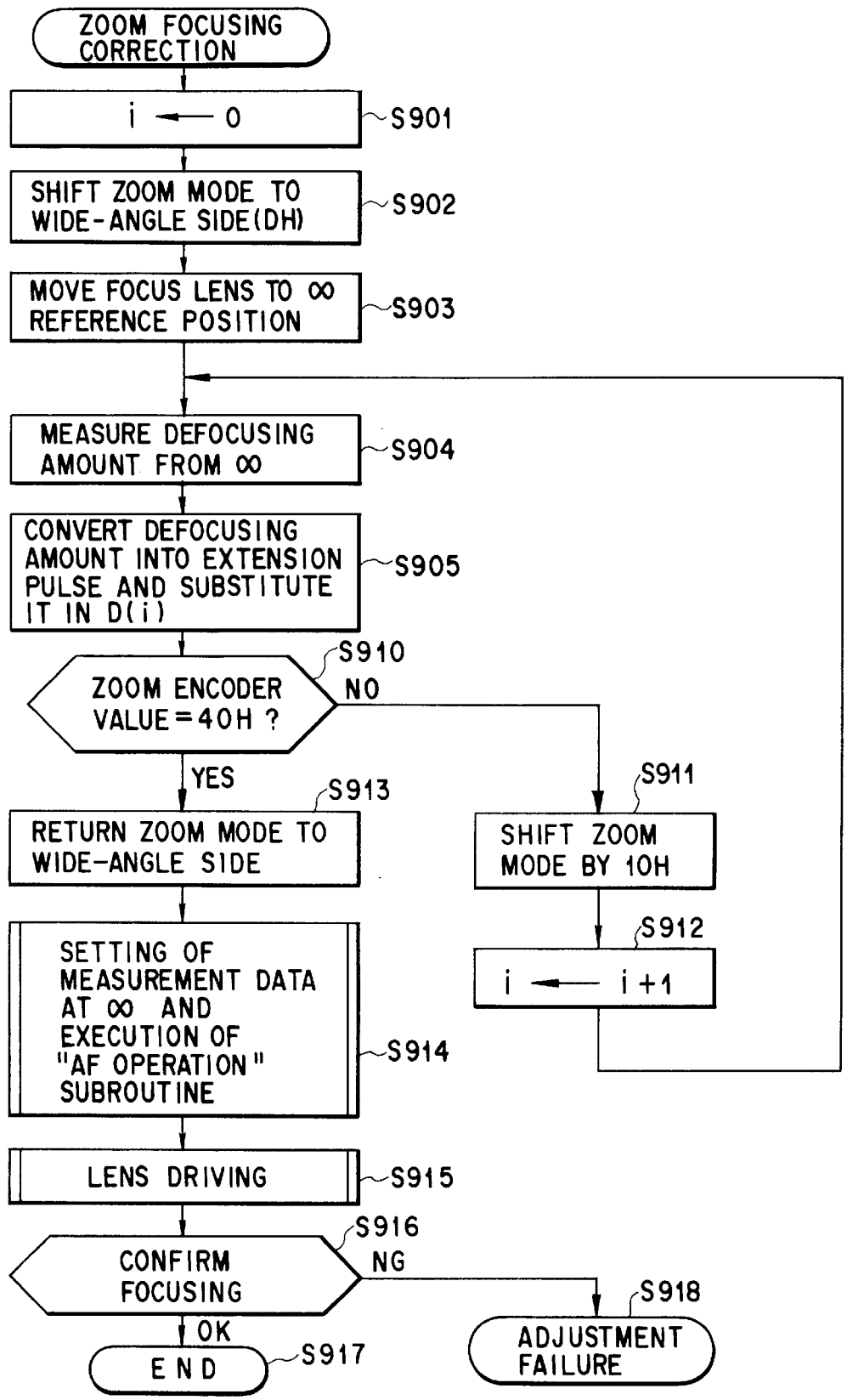
FIG. 19 is a flow chart showing a program of an AF adjustment device when zoom focusing correction is performed.

FIG. 19 is a flow chart showing a program of the AF adjustment device when the zoom focusing correction is performed using the flash memory 1 in the 1-μCOM 11 of the present invention to store correction data.

When this program is executed, i is initialized (step S901). The zoom mode is shifted to the wide-angle side (0H) (step S902), and the focus lens is moved to the infinity reference position (step S903). At this time, the lens refers to an infinity chart. The focus measurement device measures the defocusing amount of the lens. The defocusing amount is converted into a lens extension pulse amount, and the converted value is substituted in D(i). The value D(i) is stored in the RAM 5 in the 1-μCOM 11 (steps S904 and S905). The value D(i) may be directly substituted in the flash memory. However, it takes much write time, and the rewrite guarantee count of the flash memory in the 1-μCOM 11 is small. It is therefore plausible to write data in the flash memory 1 at once after all the adjustment operations are completed.

The zoom mode is then shifted by an encoder value of 10H. The above operations are repeated to determine correction data to be substituted in the values D0 to D4 (steps S910 to S912). Thereafter, the zoom mode is returned to the wide-angle side (step S913). After the distance measurement value is set at infinity, the actual "AF operation" subroutine is executed (step S914). An operation is performed using the correction value. On the basis of the operation result, the focus lens is driven (step S915), and focusing is confirmed (step S915). If the result is good, all the operations are ended (step S917). If the result is bad, an adjustment failure is detected (step S918).

FIG. 18 is an example of photometric value correction using a nonvolatile memory.

This technique is disclosed in Jpn. Pat. Appln. KOKAI Publication No. 62-25733 (corresponding to U.S. Pat. No. 4,737,814) and will be simply described below.

Referring to FIG. 18, an error between a photometric value at a reference luminance and a standard value is stored in a nonvolatile memory 70 (flash memory 1). When the camera is used, the photometric value is corrected to a normal photometric value on the basis of the error value (correction value) in the "AE operation" subroutine shown in FIG. 10.

FIG. 20 is a flow chart of a program on the adjustment device side for forming the photometric correction data in the flash memory 1 as part of the AE adjustment.

When this program is executed, the luminance of a luminance adjustment device is set to a predetermined value for adjustment (step S1001). A general error value (normally "0") is set to FCV (step S1002). FCV is a variable in which correction data to be written in the flash memory 1 is substituted. A "photometry" subroutine is executed (step S1003). Since "0" is set as the correction value, an error amount ACV with respect to the standard value is output, and the "AE operation" subroutine is executed to obtain ACV (step S1004). ACV can be substituted in FCV to correct the photometric value (step S1005). The "photometry" subroutine is executed again (step S1006), and thereafter, the "AE operation" subroutine is executed using FCV (step S1007). It is checked whether the photometric value is exactly corrected (step S1008). If the checking result is "OK", the program is ended (step S1009). If the checking result is "NG", an adjustment failure is detected (step S1010).

Figure 21:
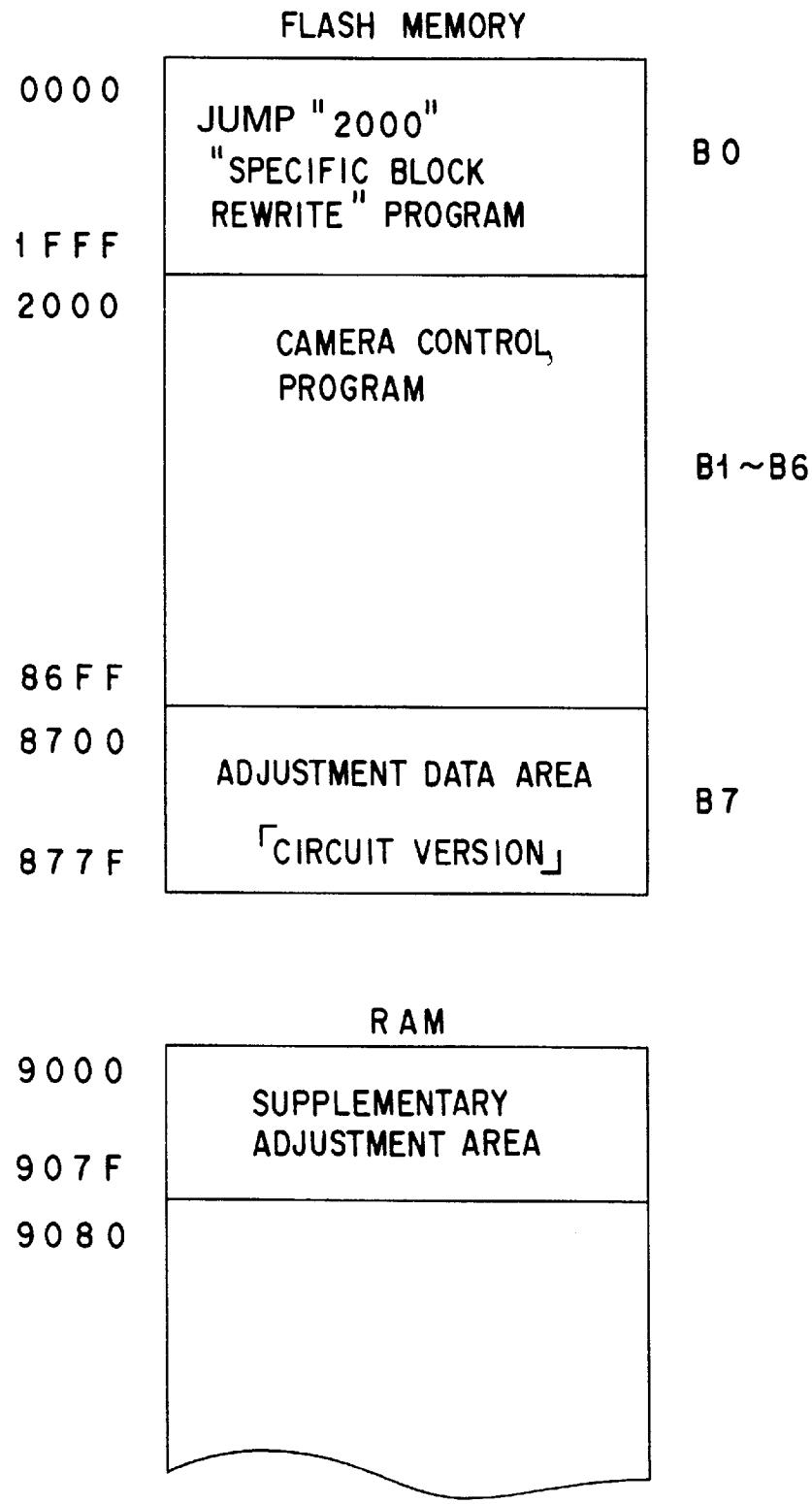
FIG. 21 is a view showing an address map of the flash memory 1 when the "specific block write" program is not present in the 1-μCOM 11c or the ROM 2.

FIG. 21 is a view showing an address map of the flash memory 1 when the 1-μCOM 11 or the ROM 2 does not have the "specific block write" program.

Referring to FIG. 21, the "specific block write" program is in B0. Subroutines with no bug can also be written in this block. B0 cannot be erased because it has the "specific block write" program. Therefore, in the 1-μCOM 11 which starts from address "0000" upon power-ON reset, an instruction which directs a jump to the next block can be placed at the beginning. When a block other than B0 is selected to store the "specific block write" program, it is sufficient to consider that the selected block cannot be erased. B1 to B6 store the camera control program. In this case, B7 serves as an adjustment data (correction value) area. The "circuit version" data can be conveniently stored in this adjustment data area. In this 1-μCOM 11, a RAM area starts from address "9000".

The adjustments in FIGS. 19 and 20 are performed using the programs when the camera is actually used. In the actual "AF operation" and "AE operation" subroutines, data in the flash memory 1 is used as a correction value. However, as described above, it is more advantageous not to rewrite the flash memory 1 during the adjustment.

At the time of adjustment, addresses "9000" to "907F" of the RAM 5 are assumed to be used in place of addresses "8700" to "877F". That is, when the adjustment is performed using the RAM 5 in place of the flash memory 1 by some method, the RAM 5 can be transferred to the flash memory 1 after all the adjustments are completed.

Four techniques of a method of substituting the RAM 5 for the flash memory 1 will be described below.

Figure 22:
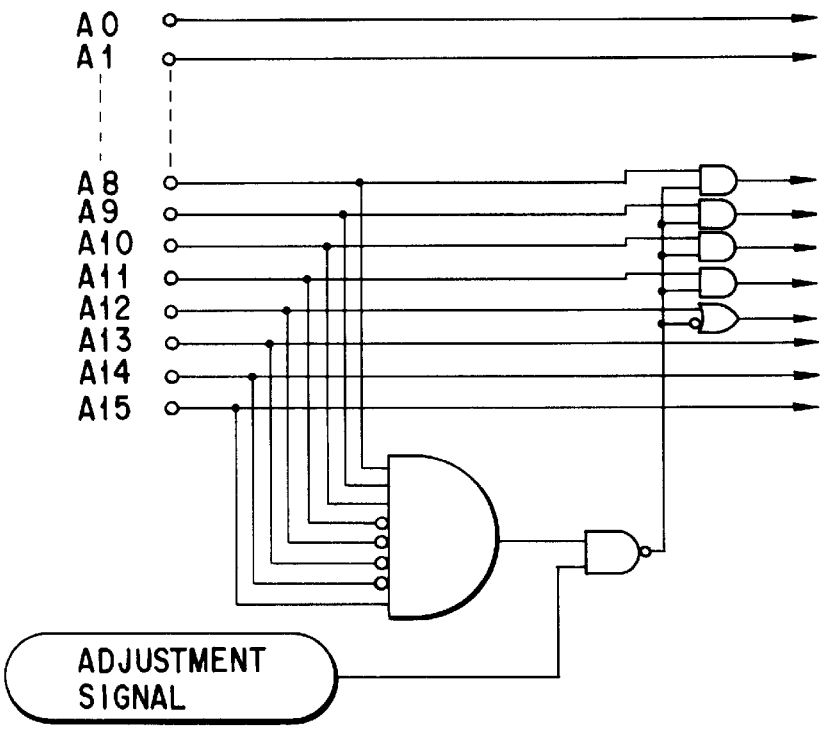
FIG. 22 is a view showing a method of using hardware in the 1-μCOM 11 as the ROM 5.

FIG. 22 is a view showing a technique of substituting hardware in the 1-μCOM 11 as the RAM 5. Referring to FIG. 22, the address bus bits A8 to A15 are monitored, and if the address bus bits A8 to A15 represent "87", and an adjustment signal is at "H" level, the address bus bits A8 to A15 are updated to represent "90". The updated address bus is connected to only the flash memory and the RAM. Note that the adjustment signal may also be used as a port signal or a register signal or the like in the 1-μCOM.

Figures 23A, 23B:
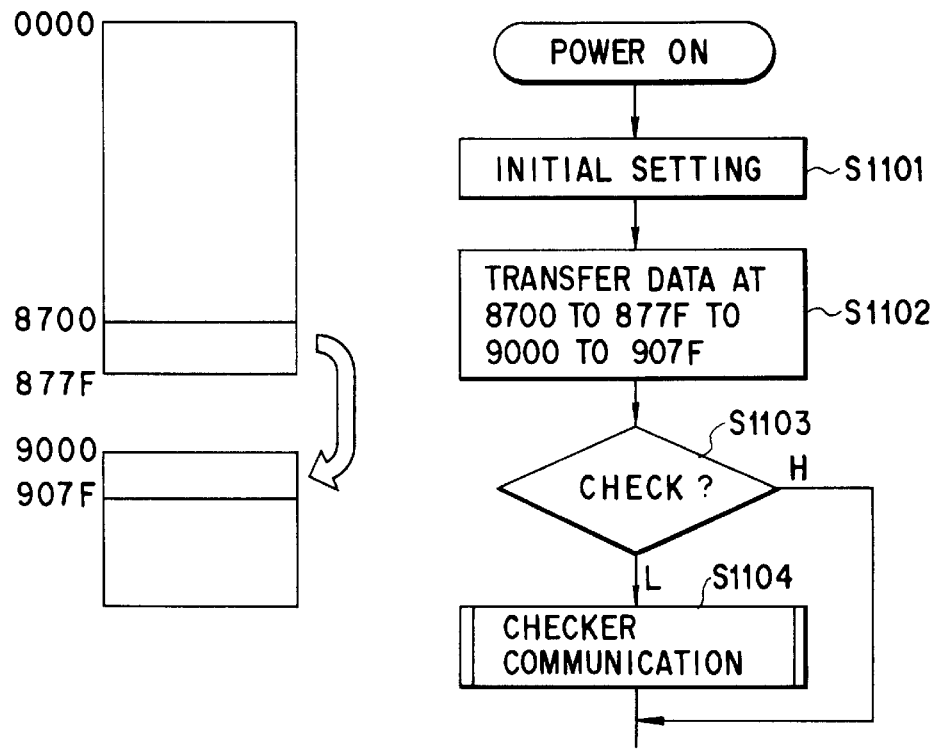
FIGS. 23A and 23B are views showing methods of temporarily moving data in the flash memory 1 to the RAM 5 and using data in the RAM 5 as correction data.

FIGS. 23A and 23B are views showing a method of temporarily moving data on the flash memory 1 to the RAM 5 and using the data in the RAM 5 as correction data. In this case, the flow chart in FIG. 8 is modified as shown in FIG. 23B. After power-ON, data in the flash memory (addresses "8700" to "877F") 1 is transferred to the RAM (addresses "9000" to "907F") 5, and thereafter, the flow is shifted to the "checker communication" subroutine. In this case, in the "AF operation" and "AE operation", data stored in the storage area of the RAM 5 is used as a correction value even when the camera is actually used. Therefore, the correction value is sufficiently written in the RAM 5 at the time of adjustment (steps S1101 to S1104).

Figures 24A, 24B, 24C:
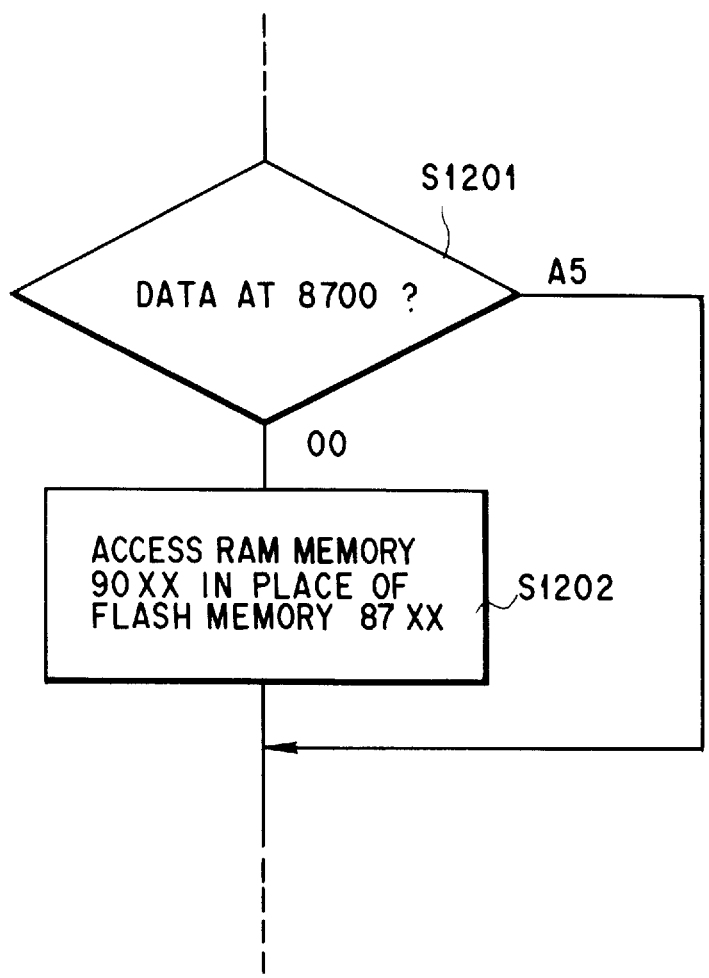
FIGS. 24A to 24C are views showing methods of writing "00H" at a predetermined address of the flash memory 1 before adjustment and writing "A5H" after adjustment.

FIGS. 24A to 24C are views showing a method of writing "00H (FIG. 24A)" at a predetermined address (e.g., address "8700") of the flash memory 1 before adjustment and writing "A5H (FIG. 24B)" after adjustment. In the "AF operation" or "AE operation", whenever a value of the flash memory 1 is used, all the determination elements as shown in FIG. 24C are included in the program in advance. That is, if "00" is detected, data in the RAM 5 is read. If "A5" is detected, data in the flash memory 1 is read. Therefore, lower eight bits of the flash memory 1 and the RAM 5 are in a one-to-one correspondence.

FIG. 25 is a view showing a method of rewriting the program before and after adjustment. Referring to FIG. 25, "AFC1" to "AEC2" are labels representing addresses of the flash memory 1. However, at the time of adjustment, addresses of the RAM are set and linked. An adjustment program is "CAMERA ADJ". After the adjustment, a normal address of the flash memory is linked and set. The normal program is "CAMERA ADJ". After the adjustment, the normal address of the flash memory 1 is linked and set. The normal program is "CAMERA USE".

FIG. 26 is a flow chart showing a program of the program transfer device 19. When this program is executed, the "CAMERA ADJ" program is transferred or switched via switching means to the flash memory 1 before camera adjustment (steps S1301, S1302, and S1305). After the camera adjustment, correction data after the adjustment and the "CAMERA USE" program are transferred or switched via switching means to the flash memory 1 (steps S1301, S1303, S1304, and S1305). In this case, only label data is updated. As a matter of course, this method can also be used even when the adjustment program is changed before and after the adjustment. This method is also effectively used when a very large capacity is required for the adjustment program.

Figure 27A:
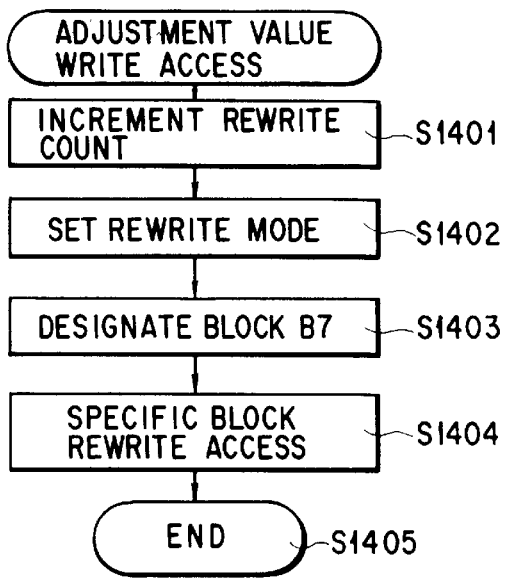
FIGS. 27A to 27D are flow charts of an adjustment value write device for writing correction data which is present in the RAM 5 or accumulated online at the end of adjustment in the flash memory 1.

FIGS. 27A to 27D are flow charts of an adjustment value write device for writing correction data which is present in the RAM 5 or accumulated online in the flash memory 1, i.e., B7 after adjustment. FIG. 27A is a flow chart when correction data left in the RAM 5 of the 1-μCOM 11 is written. The rewrite count of the flash memory 1 on B7 is incremented. The write mode is set, B7 is designated, and the "specific block rewrite" program is executed (steps S1401 to S1405).

Figure 27B:
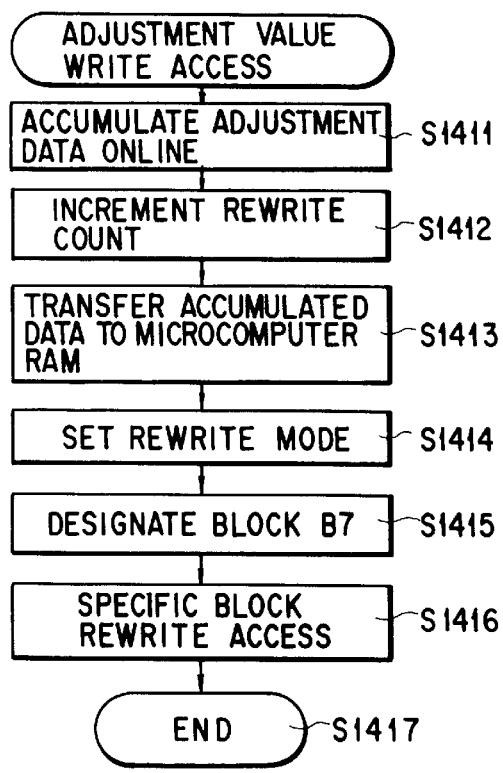

FIG. 27B is a flow chart executed when data accumulated online is written. This flow chart is the same as in FIG. 27A except that the data accumulated online is transferred to the RAM 5 in the 1-μCOM 11 (steps S1411 to S1417).

Figure 27C:
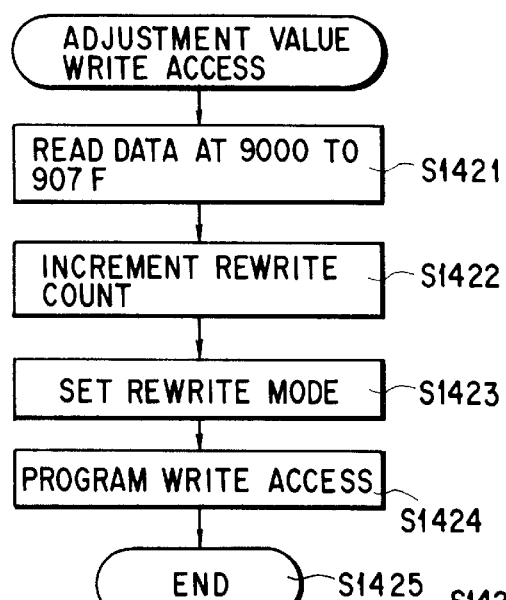

FIG. 27C is a flow chart executed when all areas of the flash memory 1 using the microcomputer a or b are rewritten. Correction data in the RAM 5 is read to prepare for writing the data in B7. The rewrite count of the flash memory 1 is incremented, and the write mode is set. Using the "program write" program, all areas of the flash memory 1 are rewritten (steps S1421 to S1425). In this case, the "specific block rewrite" program is unnecessary.

Figure 27D:
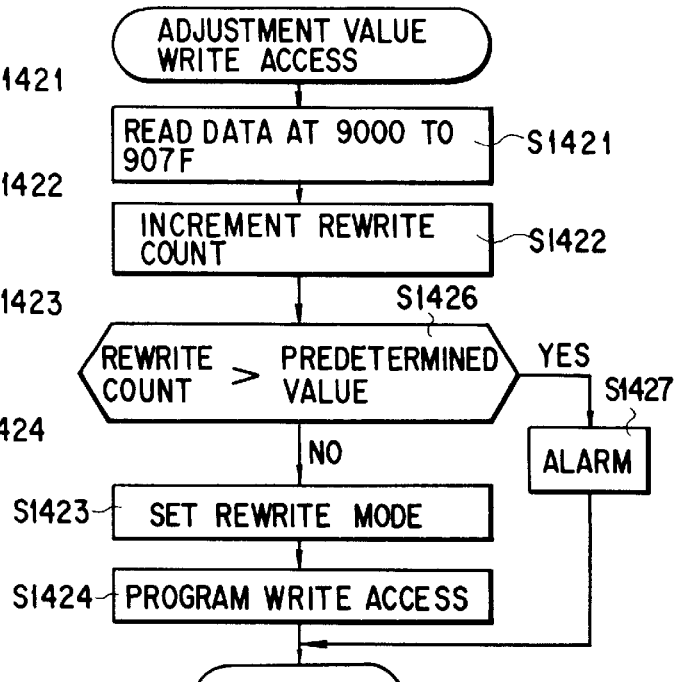

FIG. 27D is a modification of FIG. 27C. When the rewrite count of the flash memory exceeds a predetermined value, data cannot be written. Therefore, an alarm is generated to inhibit rewrite access in steps S1426 and S1427.

Figure 28:
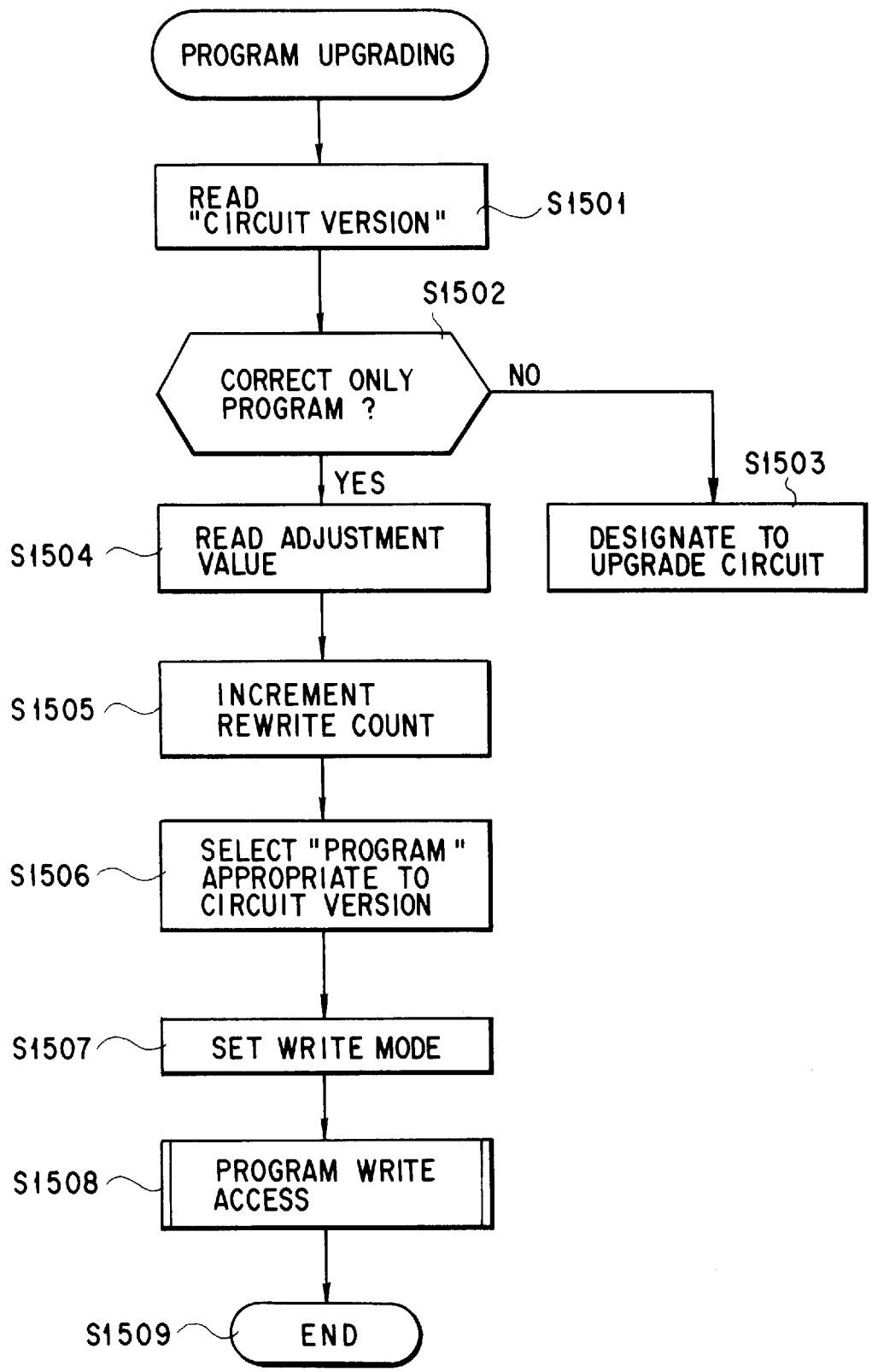
FIG. 28 is a flow chart showing a program on the program transfer device side for upgrading a program when, for example, a bug is detected in the program.

FIG. 28 is a flow chart showing a program on the program transfer device 19 side for upgrading a program in a repair shop or factory (at the time of production line change or repair) when a bug is detected in the program.

When this program is executed, the circuit version in B7 is read to check whether only the program is corrected. If the checking result is "NG", the circuit is designated to be upgraded (step S1503). If the checking result is "OK", an adjustment value (correction data) in B7 is read (step S1504). The rewrite count of the flash memory 1 is incremented (step S1505). An upgraded program appropriate to the circuit version is selected and set to be transferred (step S1506). The microcomputer 11 is set at the program write mode (step S1507), and the program is transferred and written (step S1508).

As has been described in detail, according to the present invention, there is provided a one-chip microcomputer built-in system in which, to adjust variations between products by a control program transferred to a flash memory, a specific block of the flash memory is used as an adjustment value area, programs for erasing the specific block and writing data are written in other blocks, the control program is written in the flash memory, and thereafter, data can be freely written in only the specific block, thereby allowing to store the programs and correction data even in the flash memory for only rewriting blocks, regardless of the rewrite time or count.

In addition, as has been described above in detail, according to the present invention, there is provided a one-chip microcomputer built-in system capable of writing adjustment data or upgrading a program even when a one-chip microcomputer having a flash memory with no program load ROM is mounted in a product.

Furthermore, as has been described above in detail, according to the present invention, there is provided a one-chip microcomputer built-in system capable of recording a circuit version in a flash memory at the time of manufacture and upgrading a program even when the circuit is upgraded after the one-chip microcomputer is mounted in a product.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A method for storing adjustment data in a camera having a control system main body and a one-chip microcomputer incorporated in said control system main body, wherein said one-chip microcomputer includes a flash memory storing a control program for controlling said control system main body, write means for writing data in said flash memory, a random access memory for temporarily storing data, and a communication terminal for providing communication between the one-chip microcomputer and an external adjustment device, the method comprising the steps of:

starting an adjustment operation of said external adjustment device;

storing adjustment data in said random access memory during the adjustment operation of said external adjustment device;

stopping the adjustment operation of said external adjustment device;

storing a write program, for executing a writing operation, in said flash memory; and executing the write program to write the adjustment data stored in said random access memory in said flash memory.

2. A method for storing adjustment data in a camera having a camera body, and a one-chip microcomputer incorporated in said camera body, wherein said one-chip microcomputer includes a nonvolatile memory storing a control program for controlling said camera, write means for writing data in said nonvolatile memory, a random access memory for temporarily storing data, and a communication terminal for providing communication with an external adjustment device, the method comprising the steps of:

starting an adjustment operation of said external adjustment device;

storing adjustment data in said random access memory during the adjustment operation of said external adjustment device;

stopping the adjustment operation of said external adjustment device;

storing a write program, for executing a writing operation, in said non-volatile memory; and executing the writing program to write the adjustment data stored in said random access memory in said nonvolatile memory.

3. A method for storing adjustment data in a camera having a control system main body, and a one-chip microcomputer incorporated in said control system main body, wherein said one-chip microcomputer includes a flash memory storing a control program for controlling said control system main body along with various other data, write means for writing the various other data in said flash memory, and an external device for transmitting the various other data to be written in said flash memory of said one-chip microcomputer, the method comprising the steps of:

starting an adjustment operation of the external device;

transmitting circuit version data representing a circuit version of an electric circuit board used in said control system to said one-chip microcomputer;

storing a write program, for executing a writing operation, in said flash memory; and executing the write program to write the circuit version data in said flash memory, and stopping the adjustment operation of said external adjustment device.

4. The method according to claim 3, further comprising the steps of:

storing the control program in said flash memory; and linking the control program to the circuit version data.

5. The method according to claim 3, wherein said control system main body is a camera body, the method further comprising the steps of:

transmitting an adjustment value for adjusting variations between a plurality of different cameras- that are respectively capable of using said control system main body to said camera body; and storing the adjustment value in said flash memory.

6. A method for storing adjustment data in a camera having a control system main body, and a one-chip microcomputer incorporated in said control system main body, said one-chip microcomputer including a flash memory storing a control program in a memory area thereof for controlling said control system main body, a write controller for writing the control program in said memory area of said flash memory, and an input and output (I/O) port, the method comprising the steps of:

inputting a specific block rewrite program through said input and output (I/O) port for storage in another area of said flash memory; and incorporating said one-chip microcomputer in said control system.

7. The method according to claim 6, further comprising the steps of:

inhibiting rewrite access to said another area of said flash memory; and preventing rewriting of the specific block rewrite program stored in said another area.

8. The method according to claim 6, further comprising the step of:

storing adjustment data of an object to be controlled by said one-chip microcomputer in a further memory area of the flash memory.

9. The method according to claim 6, further comprising the step of:

utilizing the control system main body as a camera body.

10. The method according to claim 9, further comprising the steps of:

incorporating an external communication connector in said one-chip microcomputer for communicating with an external adjustment device; and storing adjustment data of a camera to be controlled by said one-chip microcomputer in a further memory area of the flash memory.

11. A method for storing adjustment data in a camera having a control system main body, and a one-chip microcomputer incorporated in said control system main body, said one-chip microcomputer including a nonvolatile memory having a plurality of memory blocks and rewriting data in each of the plurality of memory blocks, control means, and rewrite means for rewriting data stored in said nonvolatile memory, the method comprising the steps of:

storing a rewrite program for said first memory block in a second memory block of said nonvolatile memory;

executing the rewrite program to rewrite data stored in a first memory block in accordance with a designation from an external device before said one-chip microcomputer is incorporated in said control system main body; and executing the rewrite program to rewrite data stored in said first memory block in accordance with the rewrite program stored in said second memory block after said one-chip microcomputer is incorporated in said control system main body.

12. The method according to claim 11, wherein said rewrite means included in said one-chip microcomputer includes temporary storage means, the method further comprising the steps of:

temporarily storing the various data sent from said external device in the temporary storage means; and rewriting said whole first memory block after an input operation of all the various data is completed.

13. The method according to claim 12, further comprising the step of:

correcting variations in characteristics between products in which said control system main body is to be used.

* * * * *